(12) United States Patent
Kumar et al.

(10) Patent No.: US 7,394,809 B2
(45) Date of Patent: Jul. 1, 2008

(54) METHOD AND APPARATUS FOR PACKET CLASSIFICATION USING A FOREST OF HASH TABLES DATA STRUCTURE

(75) Inventors: Alok Kumar, Santa Clara, CA (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 979 days.

(21) Appl. No.: 10/404,202

(22) Filed: Mar. 31, 2003

(65) Prior Publication Data

US 2004/0190526 A1 Sep. 30, 2004

(51) Int. Cl.
*H04L 12/28* (2006.01)
(52) U.S. Cl. ........................................... 370/392
(58) Field of Classification Search .............. None
See application file for complete search history.

(56) References Cited

U.S. PATENT DOCUMENTS

| | | | | |
|---|---|---|---|---|
| 5,615,341 | A * | 3/1997 | Agrawal et al. | 705/10 |
| 5,920,900 | A * | 7/1999 | Poole et al. | 711/216 |
| 5,951,651 | A | 9/1999 | Lakshman et al. | |
| 5,995,971 | A * | 11/1999 | Douceur et al. | 707/102 |
| 6,115,802 | A * | 9/2000 | Tock et al. | 711/216 |
| 6,141,749 | A | 10/2000 | Coss et al. | |
| 6,147,976 | A | 11/2000 | Shand et al. | |
| 6,182,228 | B1 | 1/2001 | Boden et al. | |
| 6,212,184 | B1 * | 4/2001 | Venkatachary et al. | 370/392 |
| 6,289,013 | B1 | 9/2001 | Lakshman et al. | |
| 6,301,669 | B2 | 10/2001 | Boden et al. | |
| 6,341,130 | B1 | 1/2002 | Lakshman et al. | |
| 7,031,314 | B2 * | 4/2006 | Craig et al. | 370/392 |
| 7,039,641 | B2 * | 5/2006 | Woo | 707/100 |
| 7,133,400 | B1 * | 11/2006 | Henderson et al. | 370/389 |
| 2001/0000193 | A1 | 4/2001 | Boden et al. | |
| 2002/0023080 | A1 | 2/2002 | Uga et al. | |
| 2002/0118682 | A1 | 8/2002 | Choe | |
| 2002/0152209 | A1 | 10/2002 | Merugu et al. | |
| 2002/0191605 | A1 | 12/2002 | Lunteren et al. | |

(Continued)

FOREIGN PATENT DOCUMENTS

EP 0 742 524 A2 11/1996

(Continued)

OTHER PUBLICATIONS

Chao, Next Generation Routers, IEEE, pp. 1518-1558, Sep. 2002.*

(Continued)

*Primary Examiner*—Frank Duong
(74) *Attorney, Agent, or Firm*—Caven & Aghevli LLC

(57) ABSTRACT

A packet classifier having a forest of hash tables data structure. The forest of hash tables data structure includes a number of hash tables, each hash table having a bit mask corresponding to an equivalent set of rules. Each hash table includes a number of entries, wherein an entry of a hash table may correspond to a rule. One or more of the hash tables may include a marker in one entry, wherein the marker identifies another one of the hash tables. The hash table identified by the marker is a descendant of the hash table in which the marker is placed.

61 Claims, 20 Drawing Sheets

U.S. PATENT DOCUMENTS

2003/0014525 A1 1/2003 DeLima et al.
2003/0018591 A1 1/2003 Komisky
2003/0048785 A1 3/2003 Calvignac et al.

FOREIGN PATENT DOCUMENTS

WO    WO 00/08817    2/2000

OTHER PUBLICATIONS

Milind M. Buddhikot et al., "Space Decomposition Techniques for Fast Layer-4 Switching," Proceedings of Conference on Protocols for High Speed Networks, Aug. 1999, pp. 25-41.

Pankaj Gupta et al., "Packet Classification Using Hierarchical Intelligent Cuttings," Proc. Hot Interconnects VII, Aug. 1999, Stanford./ This paper is also available in: IEEE Micro, Jan./Feb. 2000, pp. 34-41, vol. 20, No. 1.

T.V. Lakshman et al., "High-Speed Policy-Based Packet Forwarding Using Efficient Multi-Dimensional Range Matching," Proceedings of ACM Sigcomm, Sep. 1998, pp. 191-202.

V. Srinivasan et al., "Fast and Scalable Layer Four Switching," Proceedings of ACM Sigcomm, Sep. 1998, pp. 203-214.

V. Srinivasan et al., "Packet Classification Using Tuple Space Search," Proceedings of ACM Sigcomm, Sep. 1999, pp. 135-146.

V. Srinivasan et al., "Packet Classification Using Tuple Space Search," Computer Communication Review, Association for Computing Machinery, Oct. 1999, pp. 135-160, vol. 29, No. 4, XP: 000852194 Department of Computer Science, Washington University in St. Louis, USA.

* cited by examiner

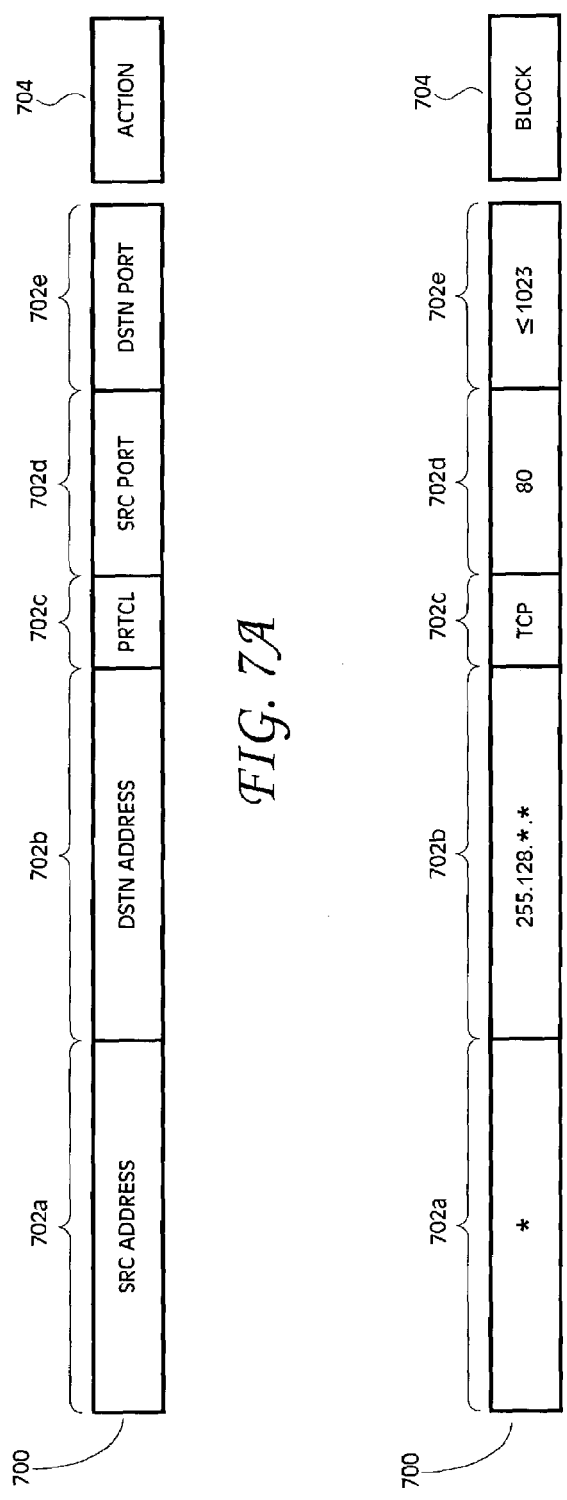
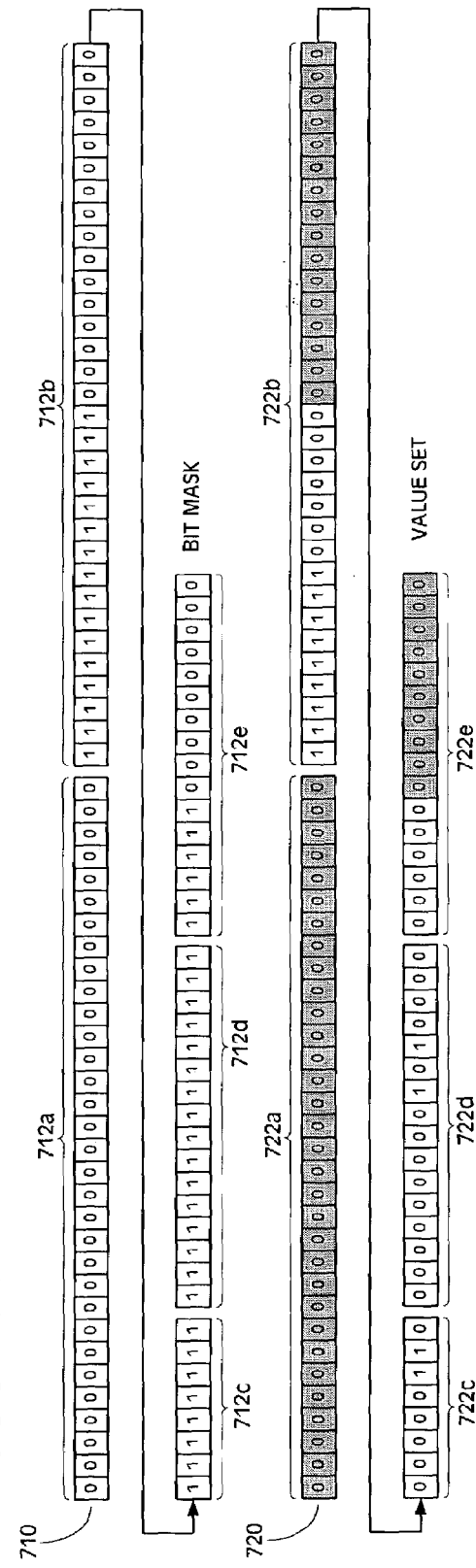
FIG. 7A
FIG. 7B

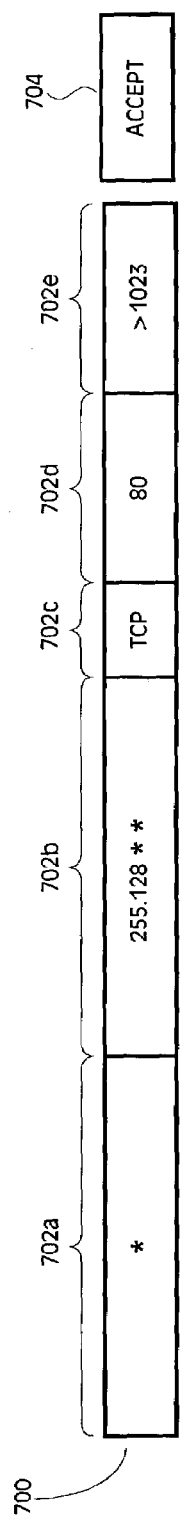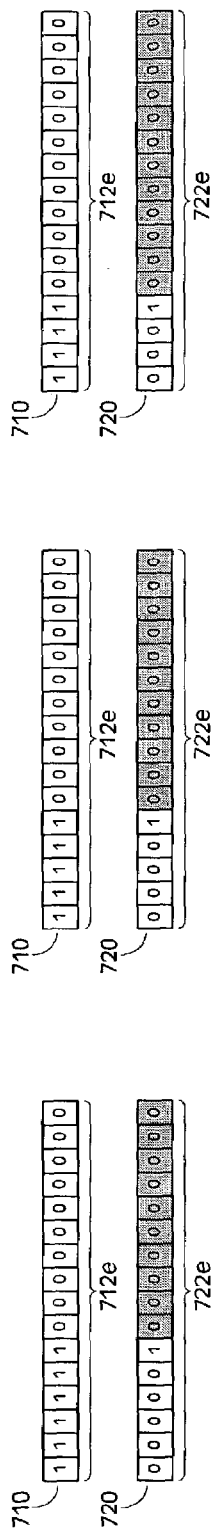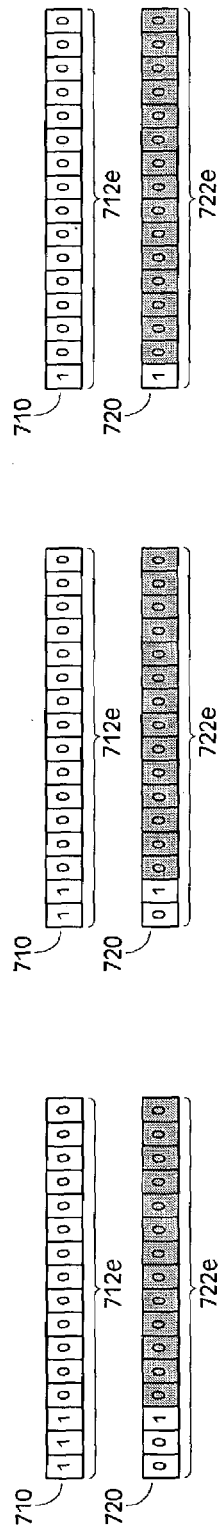

HASH TABLE A — 1300a

| | BIT MASK | 11111111 00000000 00000000 00000000 1111111111111111 | | 1010a |
|---|---|---|---|---|
| ENTRY | | KEY | RULE ID | MARKER(S) |
| 1 | | 11111111 00000000 00000000 00000000 0000000001010000 | RULE A | HASH TABLE B |
| 2 | | 10000000 00000000 00000000 00000000 0000000000010101 | | HASH TABLE B |
| 3 | | 11000000 00000000 00000000 00000000 0000000000010111 | | HASH TABLE F |

*FIG. 13A*

HASH TABLE B — 1300b

| | BIT MASK | 11111111 11111111 00000000 00000000 1111111111111111 | | 1010b |
|---|---|---|---|---|
| ENTRY | | KEY | RULE ID | MARKER(S) |
| 1 | | 11111111 11111111 00000000 00000000 0000000001010000 | RULE B | HASH TABLE C |
| 2 | | 10000000 10000000 00000000 00000000 0000000000010101 | RULE G | HASH TABLE C |

*FIG. 13B*

HASH TABLE C — 1300c

| | BIT MASK | 11111111 11111111 11111111 00000000 1111111111111111 | | 1010c |
|---|---|---|---|---|
| ENTRY | | KEY | RULE ID | MARKER(S) |
| 1 | | 11111111 11111111 00000000 00000000 0000000001010000 | RULE C | HASH TABLE F |
| 2 | | 10000000 10000000 00000000 00000000 0000000000010101 | RULE H | HASH TABLE F |
| 3 | | 11111111 11111111 11000000 00000000 0000000001010000 | RULE P | HASH TABLE F |

*FIG. 13C*

| HASH TABLE D {1300d} ||||
|---|---|---|---|
| BIT MASK | 11111111 11111111 11111111 00000000 0000000000000000 || 1010d |
| ENTRY | KEY | RULE ID | MARKER(S) |
| 1 | 11111111 11111111 00000000 00000000 0000000000000000 | RULE D | HASH TABLE E |
| 2 | 11000000 10000000 00000000 00000000 0000000000000000 | RULE I | HASH TABLE E |
| 3 | 11111111 11000000 00000000 00000000 0000000000000000 |  | HASH TABLE E |
| 4 | 11111111 11111111 11000000 00000000 0000000000000000 |  | HASH TABLE F<br>HASH TABLE E |

*FIG. 13D*

| HASH TABLE E {1300e} ||||
|---|---|---|---|
| BIT MASK | 11111111 11111111 11111111 11111111 0000000000000000 || 1010e |
| ENTRY | KEY | RULE ID | MARKER(S) |
| 1 | 11111111 11111111 00000000 00000000 0000000000000000 | RULE E |  |
| 2 | 11000000 10000000 00000000 00000000 0000000000000000 | RULE J |  |
| 3 | 11111111 11000000 00000000 00000000 0000000000000000 | RULE K | HASH TABLE F |
| 4 | 11111111 11111111 11000000 11000000 0000000000000000 | RULE O |  |

*FIG. 13E*

| HASH TABLE F {1300f} ||||
|---|---|---|---|
| BIT MASK | 11111111 11111111 11111111 11111111 1111111111111111 || 1010f |
| ENTRY | KEY | RULE ID | MARKER(S) |
| 1 | 11111111 11111111 00000000 00000000 0000000001010000 | RULE F |  |
| 2 | 10000000 10000000 00000000 00000000 0000000000010101 | RULE L |  |
| 3 | 11111111 11111111 11000000 00000000 0000000001010000 | RULE M |  |
| 4 | 11111111 11111111 11000000 00000000 0000000001010000 | RULE N |  |
| 5 | 11111111 11000000 00000000 00000000 0000000000010111 | RULE Q |  |
| 6 | 11000000 10000000 00000000 00000000 0000000000010111 | RULE R |  |

METHOD AND APPARATUS FOR PACKET CLASSIFICATION USING A FOREST OF HASH TABLES DATA STRUCTURE

FIELD OF THE INVENTION

The invention relates generally to computer networking and, more particularly, to a method and apparatus for classifying packets.

BACKGROUND OF THE INVENTION

Traditionally, packet routing in computer networks was based solely on the destination address of a packet. This routing technique essentially provided "best effort" delivery, and all traffic going to the same address was treated identically. However, packet routing based on destination address alone is insufficient to meet growing demands for greater bandwidth, enhanced security, and increased flexibility and service differentiation. To meet these objectives, equipment vendors and service providers are providing more discriminating forms of routing, including firewalls, quality of service (QoS) based routing, and bandwidth and/or resource reservation.

Generally, a firewall comprises any component, or combination of components, capable of blocking certain classes of traffic (e.g., "unwanted" or "suspicious" traffic). Firewalls are often utilized in corporate networks and other enterprise networks, and the firewall is usually implemented at the entry and/or exit points—i.e., the "trust boundary"—of the network. A typical firewall includes a series of packet filters that are designed to carry out a desired security policy.

Network service providers may have a wide array of customers, each requiring different services, service priorities, and pricing. To provide differentiated services to a number of different customers—or, more generally, to provide preferential treatment to certain classes of network traffic—service providers have implemented a variety of mechanisms, including QoS based routing and bandwidth/resource reservation. The goal of QoS based routing is to provide service differentiation for a number of different customers and/or traffic types. QoS based routing may include, for example, routing based upon class of service, special queuing procedures (e.g., per-flow queuing), and fair scheduling methods. Integrally tied with QoS routing is bandwidth or resource reservation. Bandwidth reservation generally includes reserving a specified bandwidth for certain types of traffic. For example, bandwidth reservation may be applied to traffic between two points, or bandwidth reservation may be applied to traffic relating to a certain application (e.g., multimedia, video, etc.).

To implement the above-described routing methodologies (e.g., firewalls, QoS routing, bandwidth reservation) that provide more discriminating routing of network traffic, as well as to perform other policy-based packet forwarding techniques, it is necessary to classify packets. Generally, packet classification comprises distinguishing between packets belonging to different flows or between packets associated with different traffic types. As used herein, a "flow" is a series of packets that share at least some common header characteristics (e.g., packets flowing between two specific addresses). A packet is usually classified based upon one or more fields in the packet's header. One or more filters, or "rules," are applied to this header information to determine which flow the packet corresponds with or what type of traffic the packet is associated with.

A number of methods—both hardware and software implementations—for performing packet classification based upon header data are known in the art. However, packet classification is often the bottleneck in routers, especially those routers supporting high speed links (e.g., gigabit capacity), as packet classification techniques struggle to keep pace with advances in link speeds. Further, some conventional packet classification schemes lack the ability to efficiently handle a large number of classification filters (or rules) and may also have large memory requirements.

BRIEF DESCRIPTION OF THE DRAWINGS

FIG. 7A is a schematic diagram illustrating another embodiment of a rule.

FIG. 7B is a schematic diagram illustrating an embodiment of the rule shown in FIG. 7A, including a bit mask and value set.

FIGS. 7C-7I are schematic diagrams illustrating a further embodiment of the rule shown in FIG. 7A, including a bit mask and value set.

FIGS. 13A-13F are schematic diagrams, each illustrating a hash table assembled using the method of FIG. 12, as applied to the rules shown in FIGS. 10A-10C.

DETAILED DESCRIPTION OF THE INVENTION

Embodiments of a packet classifier are disclosed herein. The disclosed embodiments of the packet classifier are described below in the context of a router implementing a firewall. However, it should be understood that the disclosed embodiments are not so limited in application and, further, that the embodiments of a packet, classifier described in the following text and figures are generally applicable to any device, system, and/or circumstance where classification of packets or other communications is needed.

Figure 1:
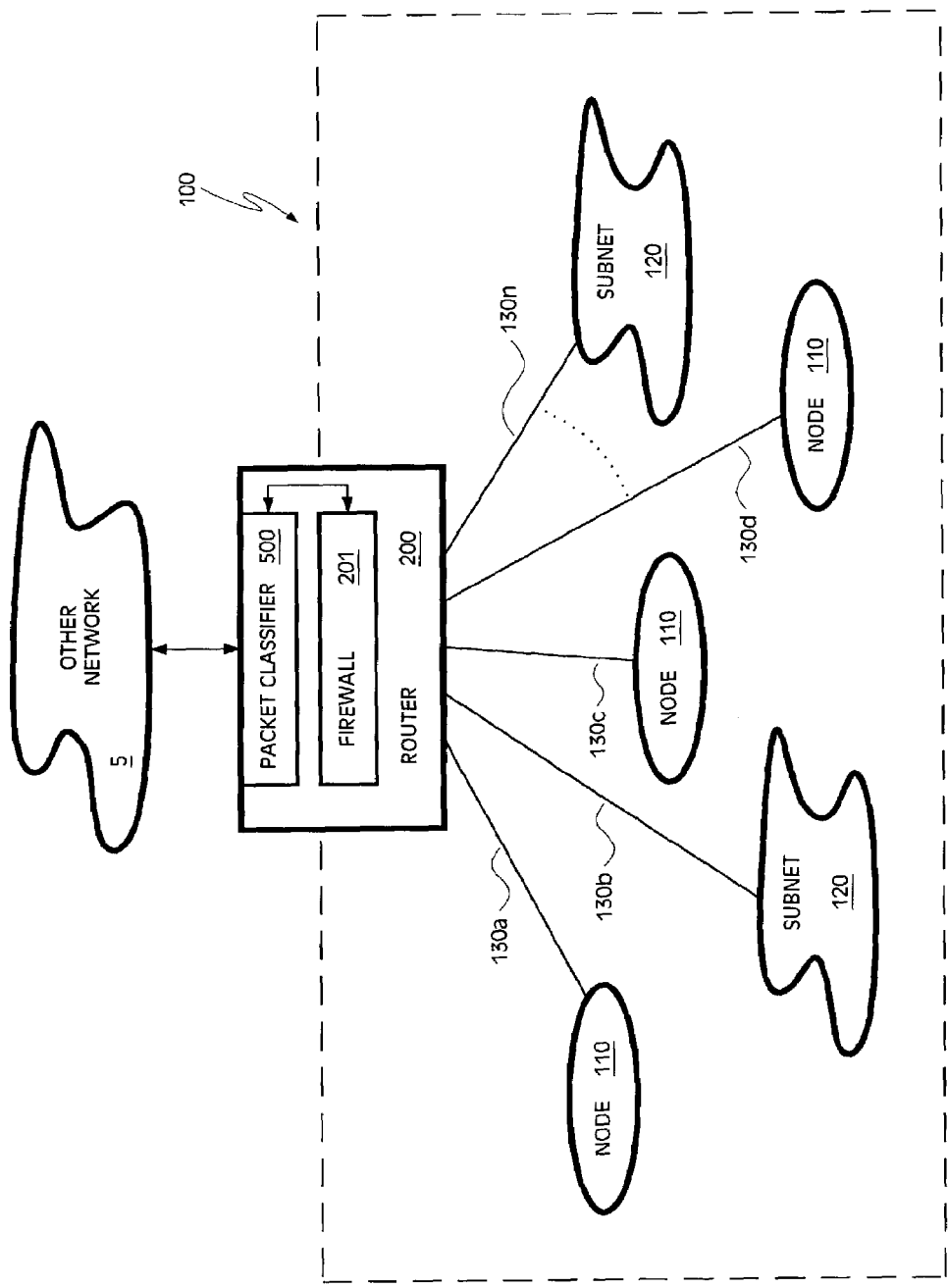
FIG. 1 is a schematic diagram illustrating an embodiment of a network having a router.

Illustrated in FIG. 1 is an embodiment of a network 100. The network 100 includes a router 200 providing a firewall 201. The router 200 (and firewall 201) may implement a specified security policy, QoS routing, and/or resource reservation, as well as any other desired policy-based routing scheme. To discriminate between packets belonging to different flows and/or between packets associated with different traffic types, the router 200 also includes a packet classifier 500, which includes a set of rules, or filters, designed to implement the desired routing scheme. Embodiments of the packet classifier 500 are described below in greater detail. The router 200 (as well as firewall 201 and packet classifier 500) may be implemented on any suitable computing system or device (or combination of devices), and one embodiment of the router 200 is described below with respect to FIG. 2 and the accompanying text.

The router 200 is coupled via a plurality of links 130— including links 130a, 130b, . . . , 130n—with a number of nodes 110 and/or a number of subnets 120. A node 110 comprises any addressable device. For example, a node 110 may comprise a computer system or other computing device, such as a server, a desktop computer, a laptop computer, or a hand-held computing device (e.g., a personal digital assistant or PDA). A subnet 120 may comprise a collection of other nodes, and a subnet 120 may also include other routers or switches. Each of the links 130a-n may be established over any suitable medium,—e.g., wireless, copper wire, fiber optic, or a combination thereof—using any suitable protocol—e.g., TCP/IP (Transmission Control Protocol/Internet Protocol), HTTP (Hyper-Text Transmission Protocol), as well as others.

The network 100 may comprise any type of network, such as a Local Area Network (LAN), a Metropolitan Area Network (MAN), a Wide Area Network (WAN), a Wireless LAN (WLAN), or other network. The router 200 also couples the network 100 with another network (or networks) 5, such as, by way of example, the Internet and/or another LAN, MAN, LAN, or WLAN. Router 200 may be coupled with the other network 5 via any suitable medium, including a wireless, copper wire, and/or fiber optic connection using any suitable protocol (e.g., TCP/IP, HTTP, etc.).

It should be understood that the network 100 shown in FIG. 1 is intended to represent an exemplary embodiment of such a system and, further, that the network 100 may have any suitable configuration. For example, the network 100 may include additional nodes 110, subnets 120, and/or other devices (e.g., switches, routers, hubs, etc.), which have been omitted from FIG. 1 for ease of understanding. Further, it should be understood that the network 100 may not include all of the components illustrated in FIG. 1.

In one embodiment, the router 200 comprises any suitable computer system, and the packet classifier 500 comprises a software application that may be implemented or executed on this computer system. An embodiment of such a computer system is illustrated in FIG. 2.

Figure 2:
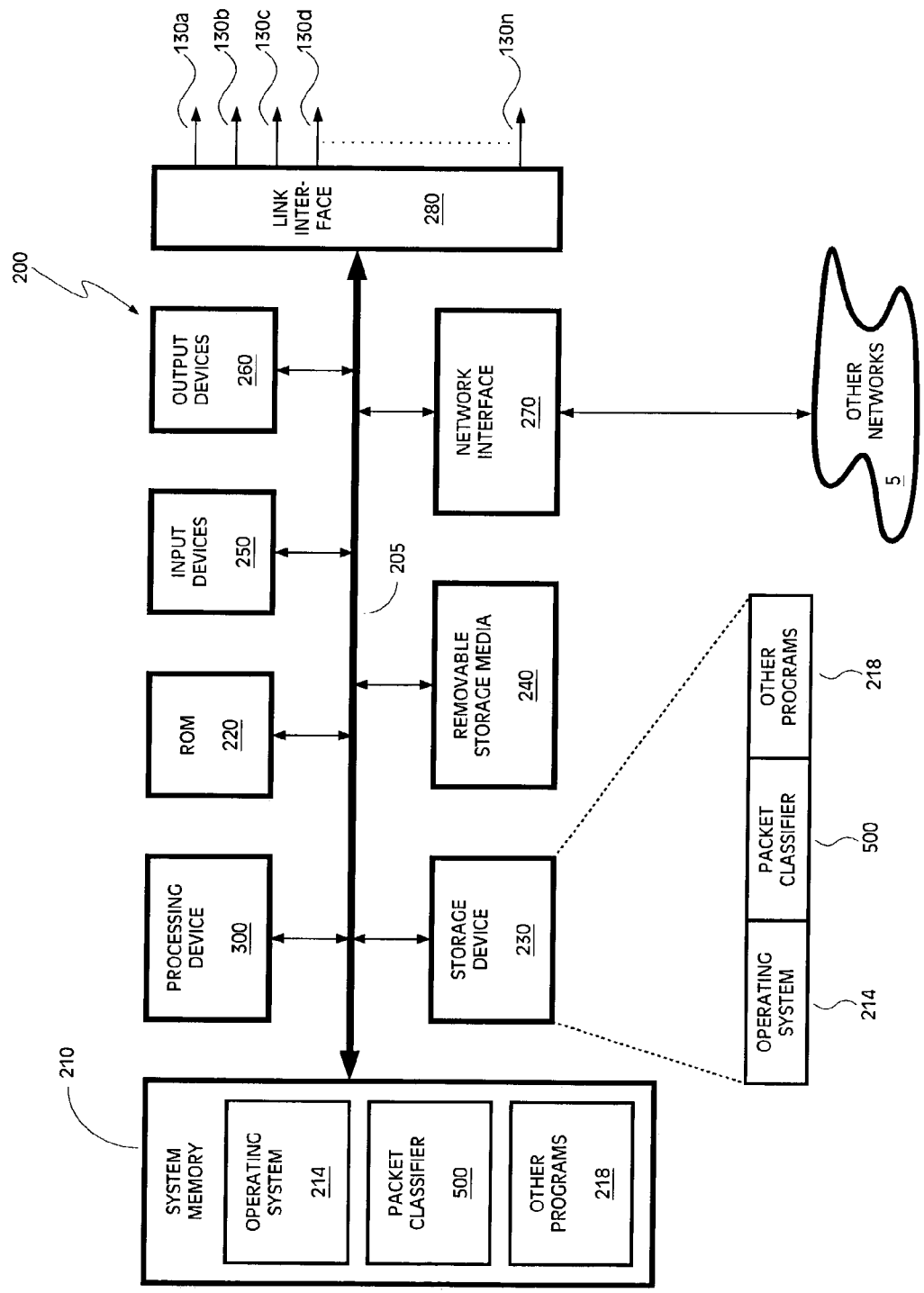
FIG. 2 is a schematic diagram illustrating an embodiment of the router shown in FIG. 1.

Referring to FIG. 2, the computer system 200 includes a bus 205 to which various components are coupled. Bus 205 is intended to represent a collection of one or more buses—e.g., a system bus, a Peripheral Component Interface (PCI) bus, a Small Computer System Interface (SCSI) bus, etc. that interconnect the components of computer system 200. Representation of these buses as a single bus 205 is provided for ease of understanding, and it should be understood that the computer system 200 is not so limited. Those of ordinary skill in the art will appreciate that the computer system 200 may have any suitable bus architecture and may include any number and combination of buses.

Coupled with bus 205 is a processing device (or devices) 300. The processing device 300 may comprise any suitable processing device or system, including a microprocessor, a network processor, an application specific integrated circuit (ASIC), or a field programmable gate array (FPGA), or similar device. An embodiment of the processing device 300 is illustrated below in FIG. 3 and the accompanying text.

Computer system 200 also includes system memory 210 coupled with bus 205, the system memory 210-comprising, for example, any suitable type of random access memory (e.g., dynamic random access memory, or DRAM). During operation of computer system 200 an operating system 214, the packet classifier 500, as well as other programs 218 may be resident in the system memory 210. Computer system 200 may further include a read-only memory (ROM) 220 coupled with the bus 205. During operation, the ROM 220 may store temporary instructions and variables for processing device 300, and ROM 220 may also have resident thereon a system BIOS (Basic Input/Output System). The computer system 200 may also include a storage device 230 coupled with the bus 205. The storage device 230 comprises any suitable non-volatile memory, such as, for example, a hard disk drive. The packet classifier 500, as well as operating system 214 and other programs 218 (e.g., a software implementation of firewall 201), may be stored in the storage device 230. Further, a device 240 for accessing removable storage media (e.g., a floppy disk drive or a CD ROM drive) may be coupled with bus 205.

The computer system 200 may include one or more input devices 250 coupled with the bus 205. Common input devices 250 include keyboards, pointing devices such as a mouse, and scanners or other data entry devices. One or more output devices 260 may also be coupled with the bus 205. Common output devices 260 include video monitors, printing devices, and audio output devices (e.g.; a sound card and speakers).

Computer system 200 further comprises a network interface 270 coupled with bus 205. The network interface 270 comprises any suitable hardware, software, or combination of hardware and software capable of coupling the computer system 200.with the network (or networks) 5. The computer system 200 also includes a link interface 280. Link interface 280 comprises any suitable hardware, software, or combination of hardware and software capable of coupling the computer system 200 with each of the links 130a-n.

It should be understood that the computer system 200 illustrated in FIG. 2 is intended to represent an exemplary embodiment of such a computer system and, further, that this computer system may include many additional components, which have been omitted for clarity and ease of understanding. By way of example, the computer system 200 may include a DMA (direct memory access) controller, a chip set associated with the processing device 300, additional memory (e.g., a cache memory), as well as additional signal lines and buses. Also, it should be understood that the computer system 200 may not include all of the components shown in FIG. 2.

In one embodiment, the packet classifier 500 comprises a set of instructions (i.e., a software application) run on a computer system—e.g., the computer system 200 of FIG. 2 or other suitable computing device. The set of instructions may be stored locally in storage device 230 or, alternatively, the instructions may be stored in a remote storage device (not shown in figures) and accessed via network 100 (or from another network 5). During operation, the set of instructions may be executed on processing device 300, wherein the instructions (or a portion thereof) may be resident in system memory 210.

In another embodiment, the packet classifier 500 comprises a set of instructions stored on a machine accessible medium, such as, for example, a magnetic media (e.g., a floppy disk or magnetic tape), an optically accessible disk (e.g., a CD-ROM disk), a flash memory device, etc. To run packet classifier 500 on, for example, computer system 200, the device 240 for accessing removable storage media may access the instructions on the machine accessible medium, and the instructions may then be executed in processing device 300. In this embodiment, the instructions (or a portion thereof) may again be downloaded to system memory 210.

In another embodiment, the packet classifier 500 is implemented in hardware or a combination of hardware and software (e.g., firmware). For example, the packet classifier 500 may be implemented in an ASIC, an FPGA, or other similar device that has been programmed in accordance with the disclosed embodiments.

Figure 3:
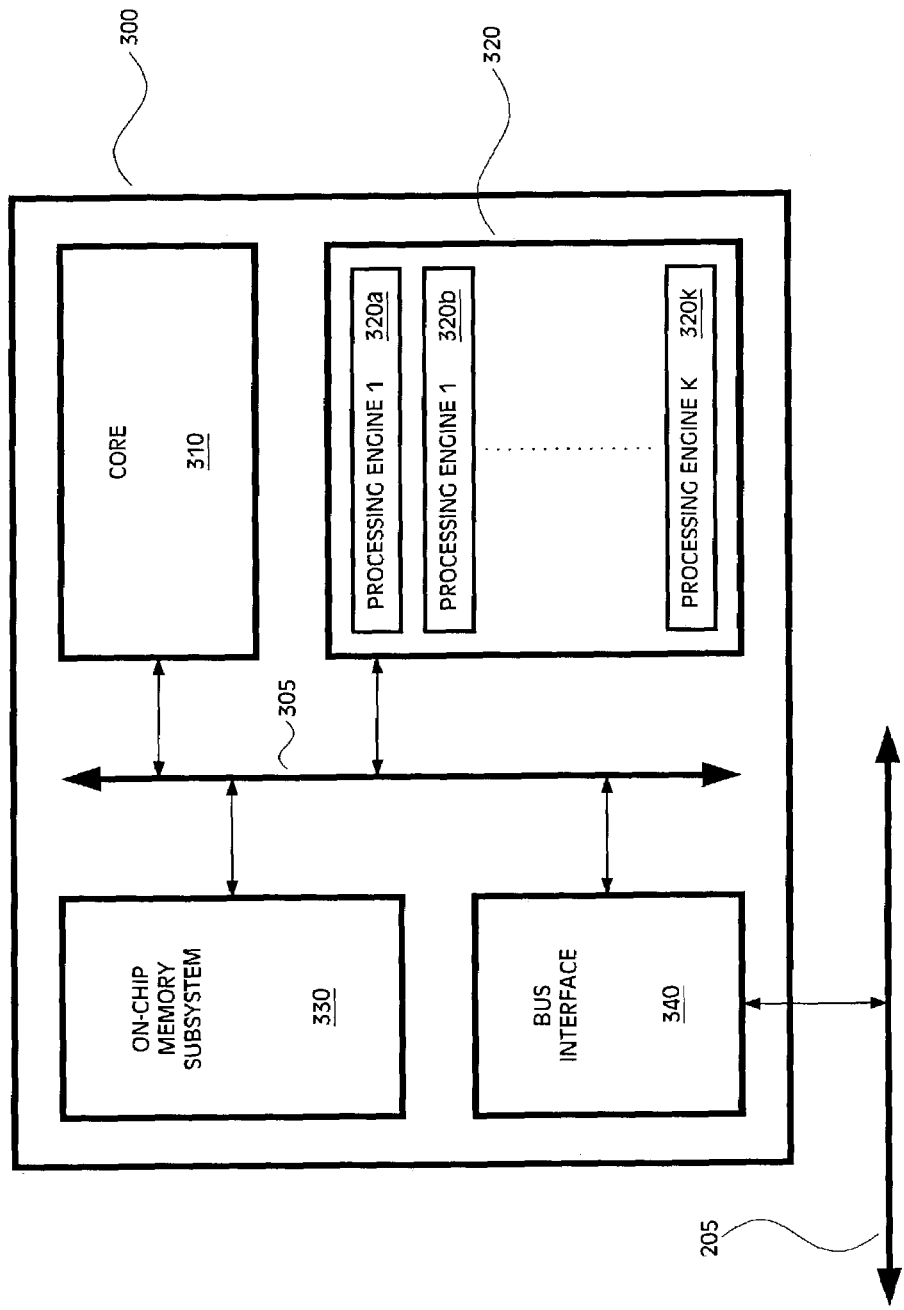
FIG. 3 is a schematic diagram illustrating an embodiment of a processing device shown in FIG. 2.

As previously noted, an embodiment of processing device 300 is illustrated in FIG. 3 and the accompanying text. It should be understood, however, that the processing device 300 shown in FIG. 3 is but one embodiment of a processing device upon which the disclosed embodiments of a packet classifier 500 may be implemented. Those of ordinary skill in the art will appreciate that the disclosed embodiments of packet classifier 500 may be implemented on many other types of processing systems and/or processor architectures.

Turning now to FIG. 3, the processing device 300 includes a local bus 305 to which various functional units are coupled. Bus 305 is intended to represent a collection of one or more on-chip buses that interconnect the various functional units of processing device 300. Representation of these local buses as a single bus 305 is provided for ease of understanding, and it should be understood that the processing device 300 is not so limited. Those of ordinary skill in the art will appreciate that the processing device 300 may have any suitable bus architecture and may include any number and combination of buses.

A core 310 and a number of processing engines 320 (e.g., processing engines 320a, 320b, . . . , 320k) are coupled with the local bus 305. In one embodiment, the core 310 comprises a general purpose processing system, which may execute operating system 214. Core 310 may also control operation of processing device 300 and perform a variety of management functions, such as dispensing instructions to the processing engines 320 for execution. Each of the processing engines 320a-k comprises any suitable processing system, and each may include an arithmetic and logic unit (ALU), a controller, and a number of registers (for storing data during read/write operations). Also, in one embodiment, each processing engine 320a-k provides for multiple threads of execution (e.g., four).

Also coupled with the local bus 305 is an on-chip memory subsystem 330. Although depicted as a single unit, it should be understood that the on-chip memory subsystem 330 may—and, in practice, likely does—comprise a number of distinct memory units and/or memory types. For example, such on-chip memory may include SDRAM (synchronous dynamic random access memory), SRAM (static random access memory), and/or flash memory (e.g., FlashROM). It should be understood that, in addition to on-chip memory, the processing device 300 may be coupled with off-chip memory (e.g., ROM 220, off-chip cache memory, etc.).

Processing device 300 further includes a bus interface 340 coupled with local bus 305. Bus interface 340 provides an interface with other components of computer system 200, including bus 205. For simplicity, bus interface 340 is depicted as a single functional unit; however, it should be understood that, in practice, the processing device 300 may include multiple bus interfaces. For example, the processing device 300 may includes a PCI bus interface, an IX (Internet Exchange) bus interface, as well as others, and the bus interface 340 is intended to represent a collection of one or more such interfaces.

It should be understood that the embodiment of processing device 300 illustrated and described with respect to FIG. 3 is but one example of a processing device that may find use with the disclosed embodiments of a packet classifier and, further, that the processing device 300 may have other components in addition to those shown in FIG. 3, which components have been omitted for clarity and ease of understanding. For example, the processing device 300 may include other functional units (e.g., an instruction decoder unit, an address translation unit, etc.), a thermal management system, clock circuitry, additional memory, and registers. Also, it should be understood that a processing device may not include all of the elements shown in FIG. 3.

Figure 4:
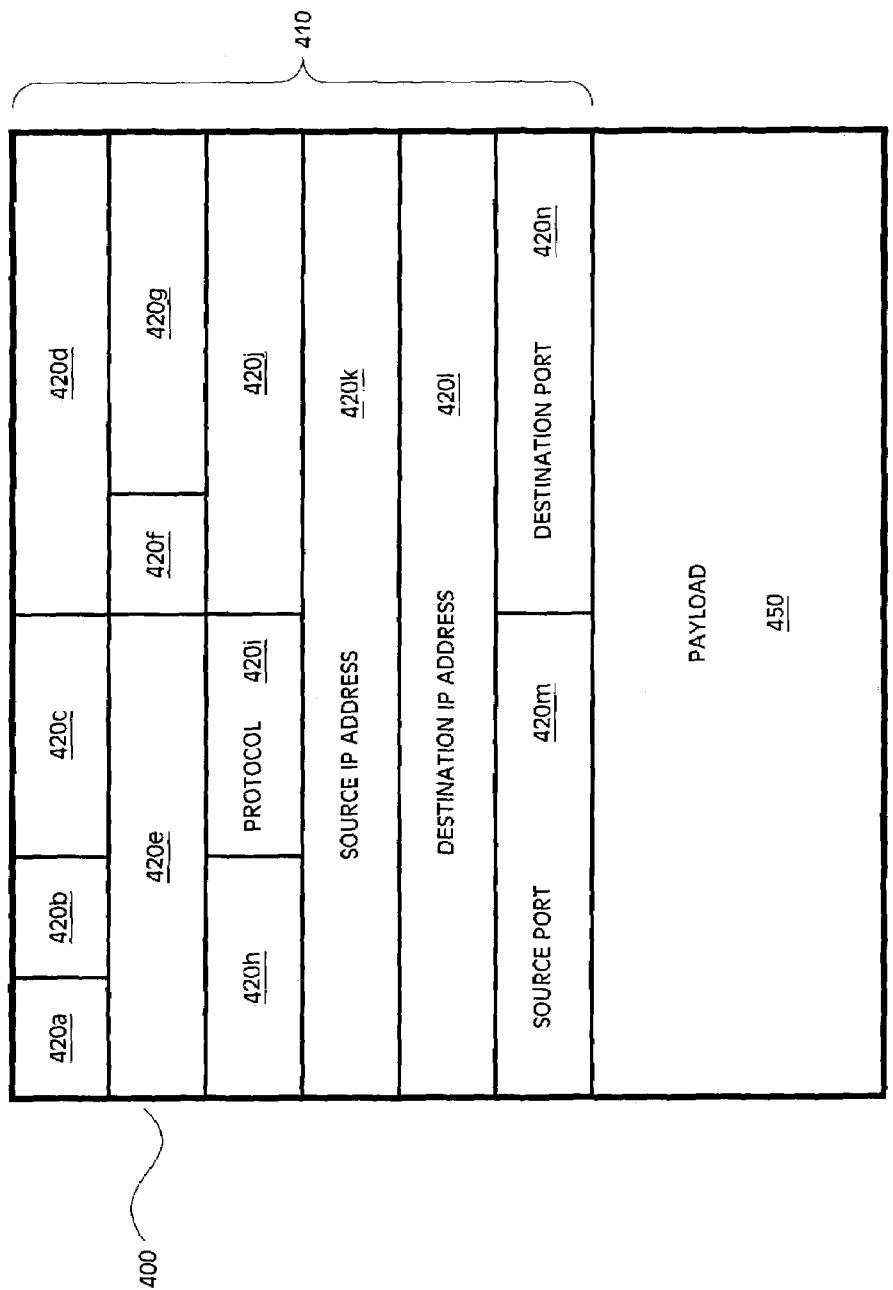
FIG. 4 is a schematic diagram illustrating the makeup of an exemplary packet.

Referring now to FIG. 4, illustrated is an example of a packet 400, as may be received at router 200 (e.g., from other networks 5). The packet includes a header 410 and a payload (or data) 450. The header 410 includes a number of fields, including fields 420a, 420b, . . ., 420n. Generally, the fields 420a-n contain identifying information about the packet 400. By way of example, the header 410 may include the protocol 420i (e.g., TCP), a source IP address 420k, a destination address 420j, a source port 420m, and a destination port 420n. Each of the source and destination addresses 420k, 420i may include thirty-two (32) bits, each of the source and destination ports 420m, 420n sixteen (16) bits, and the protocol 420i eight (8) bits. It will be appreciated by those of ordinary skill in the art that these are but a few examples of the types of information that may be contained in the header of a packet and, further, that packet header 410 may contain any other information, as required by the specific hardware and/or application at hand.

Figure 5:
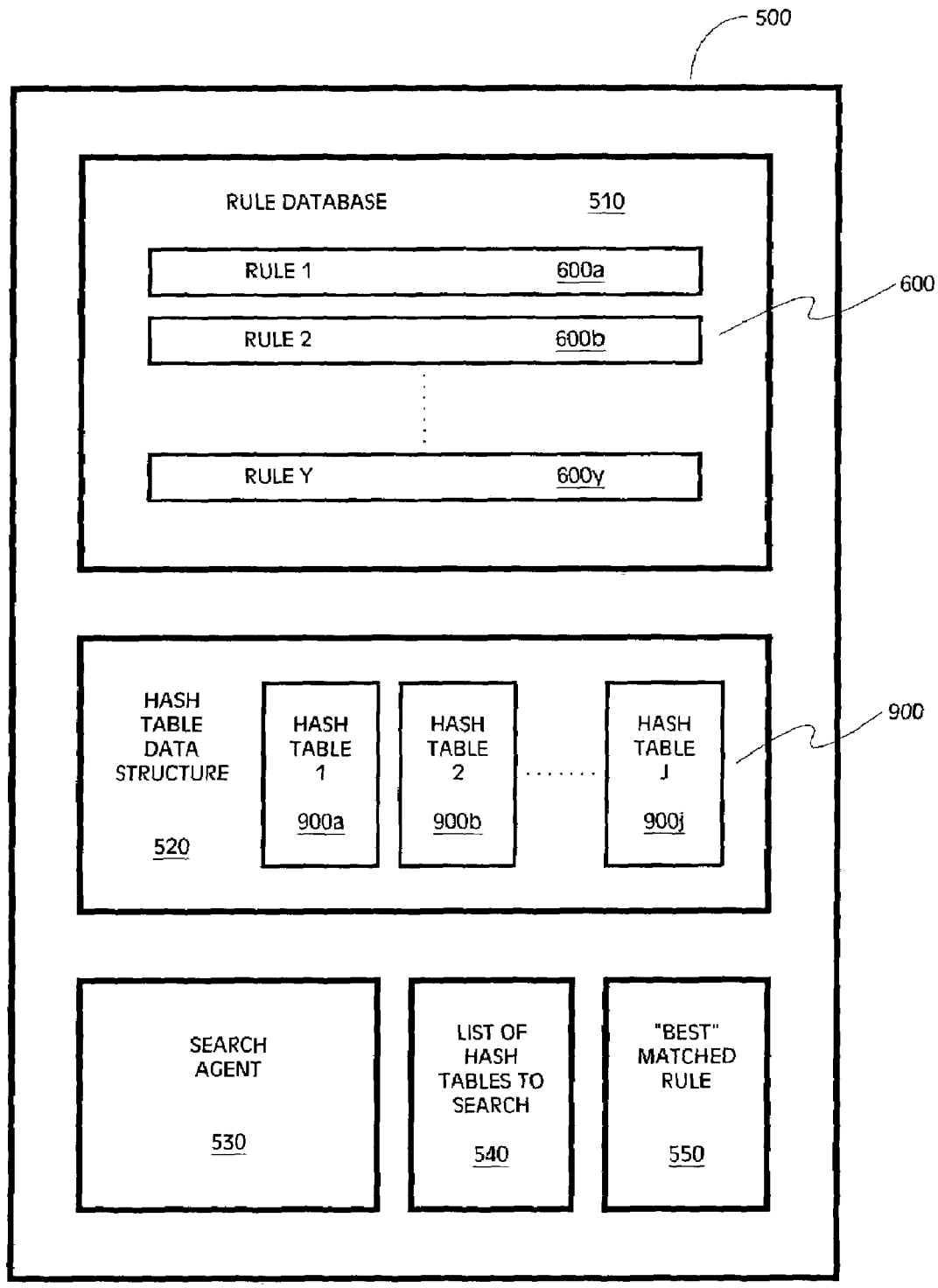
FIG. 5 is a schematic diagram illustrating an embodiment of the packet classifier shown in FIG. 2.

Illustrated in FIG. 5 is an embodiment of packet classifier 500. The packet classifier 500 includes a rule database 510, a hash table data structure 520, and a search agent 530. Packet classifier 500 also stores a list of hash tables to search 540 and a "best" matched rule 550. In one embodiment, the packet classifier 500 shown in FIG. 5 is implemented in software (either a set of instructions stored in computer system 200 or a set of instructions read from a machine-accessible medium). In another embodiment, however, the packet classifier 500 of FIG. 5 may be implemented in hardware or a combination of hardware and software.

Figure 6:
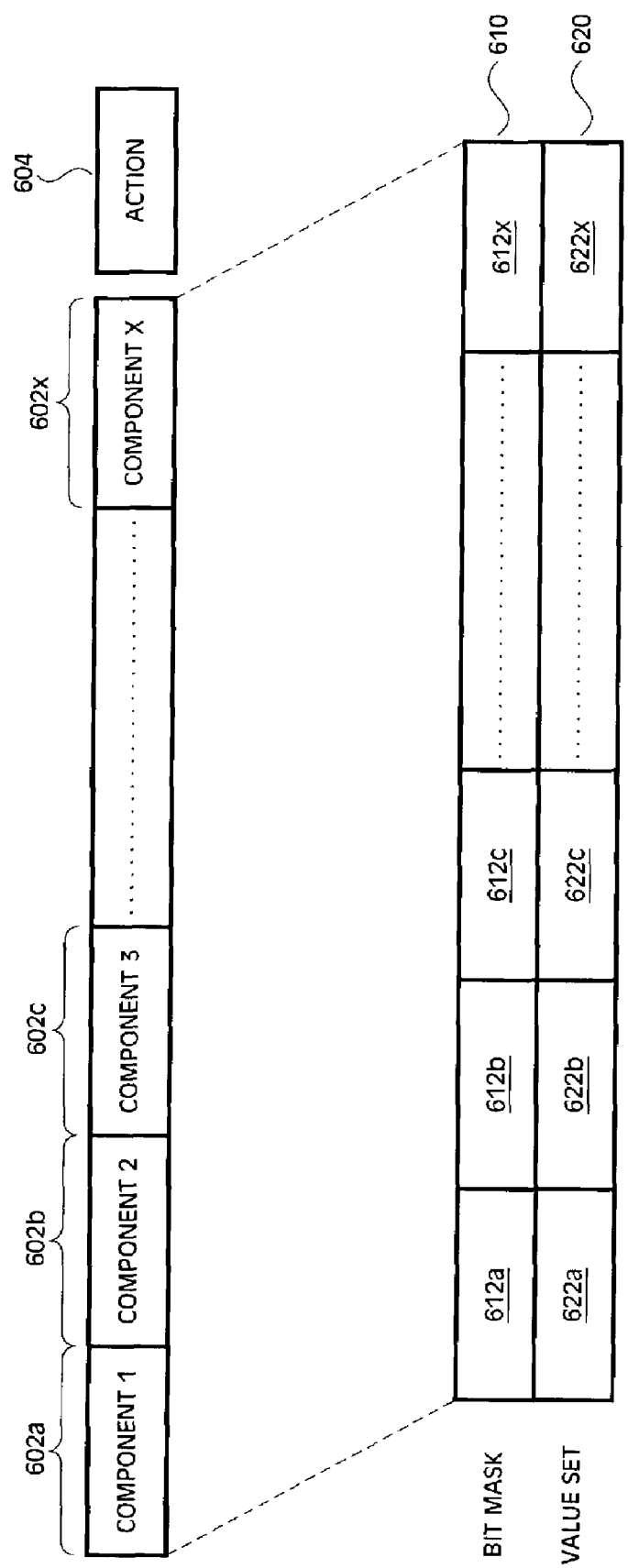
FIG. 6 is a schematic diagram illustrating an embodiment of a rule, as shown in FIG. 5.
Figure 8:
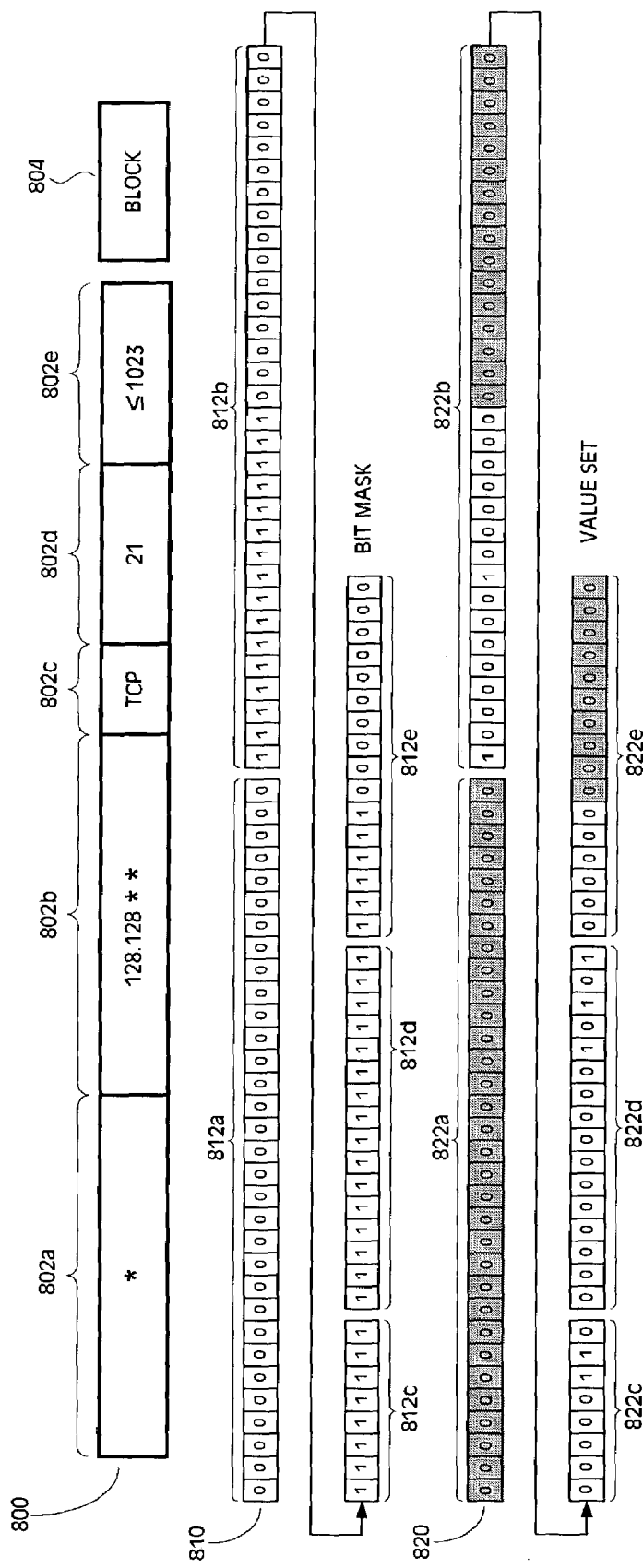
FIG. 8 is a schematic diagram illustrating yet another embodiment of the rule shown in FIG. 7A, including a bit mask and value set.

Rule database 510 includes a number of rules 600, including rules 600a, 600b, . . . , 600y. The collection of rules 600a-y is designed to implement a desired policy-based routing scheme (e.g., a firewall, QoS routing, and/or resource reservation, etc.), as described above. Various embodiments of a rule 600 are illustrated in FIGS. 6 through 8. The hash table data structure 520 (also referred to herein as a "forest of hash tables") includes a number of hash tables 900, including hash tables 900a, 900b, . . . , 900j. An embodiment of a hash table 900 is shown and described below with respect to FIG. 9. Within the hash table data structure 520, the rules 600 are organized into a number of "equivalent sets" of rules, wherein each equivalent set (defined below) is represented by one of the hash tables 900. The forest of hash tables data structure 520 is described below in greater detail, and an embodiment of a method of constructing the hash table data structure is presented below in FIG. 12 and the accompanying text.

Search agent 530 provides packet classifier 500 with the ability to search the hash table data structure 520. More specifically, search agent 530 can identify one or more rules 600 that are to be applied to an incoming packet based upon information (e.g., header data) contained in the packet. Embodiments of a method of searching the hash table data structure 520 are presented below in FIGS. 15A and, 5B and the accompanying text. The list of hash tables to search 540 is a dynamic list identifying those hash tables 900 of hash table data structure 520 that need to be searched for any received packet. The "best" matched rule 550, which is also dynamically updated throughout the search process, stores a rule identified by search agent 530 that is to be applied to a received packet. In one embodiment, the rule stored as the "best" matched rule 550 corresponds to the highest priority rule. However, it should be understood that selection of the "best" matched rule may be based on any suitable criteria.

Turning to FIG. 6, an embodiment of a rule 600 is illustrated. Generally, the rule 600 specifies a set of criteria that suggests a particular flow to which a packet satisfying the criteria belongs. The rule 600 includes a number of components, including components 602a, 602b, . . . , 602x. In one embodiment, each component 602a-x corresponds to a field in the header of a packet. However, in other embodiments, the components 602a-x of a rule 600 may include other information, such as application header fields, link identification information, time-of-day, etc. A packet "matches" the rule if, for each component 602a-x, the corresponding field in the header matches that component. A component 602a-x may comprise a regular expression on the corresponding header field or, alternatively, a mask or character/number specification applied to the corresponding header field. It should be noted here that, generally, any regular expression on a header field may be expanded to one or more masks. A mask or character/number specification may be in the form of an exact match (e.g., destination port=80) or a range specification (e.g., destination port≦1023). A rule may contain any suitable number of components 602a-x, and the number X of fields in a rule is referred to herein as the dimension. Also, a rule 600 has an associated action 604 (e.g., accept, block, etc.) that is to be applied to any packet matching that rule.

Each rule 600 may be represented by a bit mask 610 and a value set 620. The bit mask 610 is a bit array having bits set (e.g., a "1-bit") for those bits that the rule 600 "cares for," whereas those bits that the rule does "not care for" are not set (e.g., a "0-bit"). The value set 620 is a bit array that contains, at those bits set in the bit mask 610 (i.e., at those bits the rules cares for), the actual value of these bits, respectively, in the rule. At those bits of value set 620 corresponding to bits that are not set (e.g., a "0-bit") in the bit mask 610, the value set 620 contains a "0-bit". Any group of two or more rules is said to be "equivalent" if they have the same bit mask (although they may not have the same value set), and a group of equivalent rules comprises an "equivalent set." As will be explained in greater detail below, the bit mask 610 and value set 620 of each rule 600 facilitate organization of the rules 600 into the hash table data structure 520—each hash table 900 including an equivalent set of rules—and also provides a mechanism for indexing into the hash table data structure during the search process.

Referring to FIG. 7A, an embodiment of a rule is illustrated. The rule 700 includes five components—i.e., the rule's dimension is five—including a source address 702a, a destination address 702b, a protocol 702c, a source port 702d, and a destination port 702e, as well as an action 704. The combination of these packet header fields is sometimes referred to as a "5-tuple." Of course, it should be understood that FIG. 7A presents but one example of a rule and, further, that a rule may include any suitable number and type of header fields (i.e., the rule may be of any dimension).

Illustrated in FIG. 7B is an example of the rule shown in FIG. 7A. The rule specifies a source address 702a equal to "*", a destination address 702b equal to "255.128.*.*", a protocol 702c equal to "TCP", a source port 702d equal to "80", and a destination port 702e that is "≦1023", where the character "*" represents a "wild card" (i.e., any value can match the wild card). The action 704 is "block" (i.e., any packet satisfying the rule is not allowed). The bit mask 710 and value set 720 for this example are also shown in FIG. 7B. The bit mask 710 includes a portion 712a corresponding to the source address, a portion 712b corresponding to the destination address, a portion 712c corresponding to the protocol, a portion 712d corresponding to the source port, and a portion 712e corresponding to the destination port. Note that where an exact match is required in the rule 700, the bit mask 710 includes a "1-bit". However, where an exact match is not required—e.g., where a wild card "*" is present—the bit mask includes a "0-bit", as the rule does "not care for" these bits.

The value set 720 includes a portion 722a corresponding to the source address, a portion 722b corresponding to the destination address, a portion 722c corresponding to the protocol, a portion 722d corresponding to the source port, and a portion 722e corresponding to the destination port. At those bits in the value set 720 corresponding to the bits that have been set (e.g., a "1-bit") in the bit mask 710, the value set 720 includes actual values from the rule (e.g., the source port 80 is specified in binary notation as "0000000001010000"). To assist the reader, in FIG. 7B (as well as FIGS. 7D-7I, 8, and 10A-10C), shading is used to identify those bits in value set 720 that correspond to a "0-bit" in the bit mask 710 (or, in other words, to identify those bits in value set 720 that the rule does "not care for").

In FIG. 7B, the destination port specification of "≦1023" can be expressed in binary notation as "000000********". However, not all ranges are amenable to expression by a single mask, and this concept is illustrated in FIGS. 7C through FIG. 7I. Referring to FIG. 7C, the rule 700 now includes a destination port specification of ">1023" (all other parameters being equal to those shown in FIG. 7B). The range expression ">1023" cannot be represented by a single character string or "prefix". However, this expression can be broken down into a set of prefixes. More specifically, the range of ">1023" can be delineated by the following series of prefixes: "000001******"; "00001*******"; "0001********"; "001*********"; "01**********"; and "1*************" Accordingly, the rule 700 specified in FIG. 7C can be expanded into six different rules, one for each of the six distinct prefixes comprising the range specification ">1023". This is shown in FIGS. 7D through 7I, which illustrates the expansion of the rule 700 of FIG. 7C into six different bit mask and value set specifications. In each of FIGS. 7D through 7I, only the portion 712e and the portion 722e corresponding to the destination port of the bit mask 710 and value set 720, respectively, are illustrated (as all other components are the same as that shown in FIG. 7B). In FIGS. 7D through 7I, shading is again used in the value sets 720 to distinguish those bits the rule does "not care for" (i.e., those bits corresponding to a "0-bit" in the bit mask 710) from those bits the rule does "care for" (i.e., those bits corresponding to a "1-bit" in the bit mask 710). It should be noted here that, in general, a range of N-bits can be broken down into a maximum of 2N prefixes.

Another example of the 5-tuple rule shown in FIG. 7A is illustrated in FIG. 8. The rule 800 includes a source address equal to "*", a destination address equal to "128.128.*.*", a protocol equal to "TCP", a source port equal to "21", and a destination port that is "≦1023". The action 804 for rule 800 is "block". The bit mask 810 for rule 800 has a portion 812*a* corresponding to the source address, a portion 812*b* corresponding to the destination address, a portion 812*c* corresponding to the protocol, a portion 812*d* corresponding to the source port, and a portion 812*e* corresponding to the destination port. Likewise, the value set 820 has a portion 822*a* corresponding to the source address, a portion 822*b* corresponding to the destination address, a portion 822*c* corresponding to the protocol, a portion 822*d* corresponding to the source port, and a portion 822*e* corresponding to the destination port (shading again being used in the value set, as described above). Note that rule 800 is different than rule 700, as the destination address and source port specifications are not the same. However, the bit mask 810 of rule 800 is identical to the bit mask 710 of rule 700 in FIG. 7B—i.e., these two rules are "equivalent." Two such equivalent rules can be referenced by the same hash table 900, and an embodiment of such a bash table is shown in FIG. 9.

Figure 9:
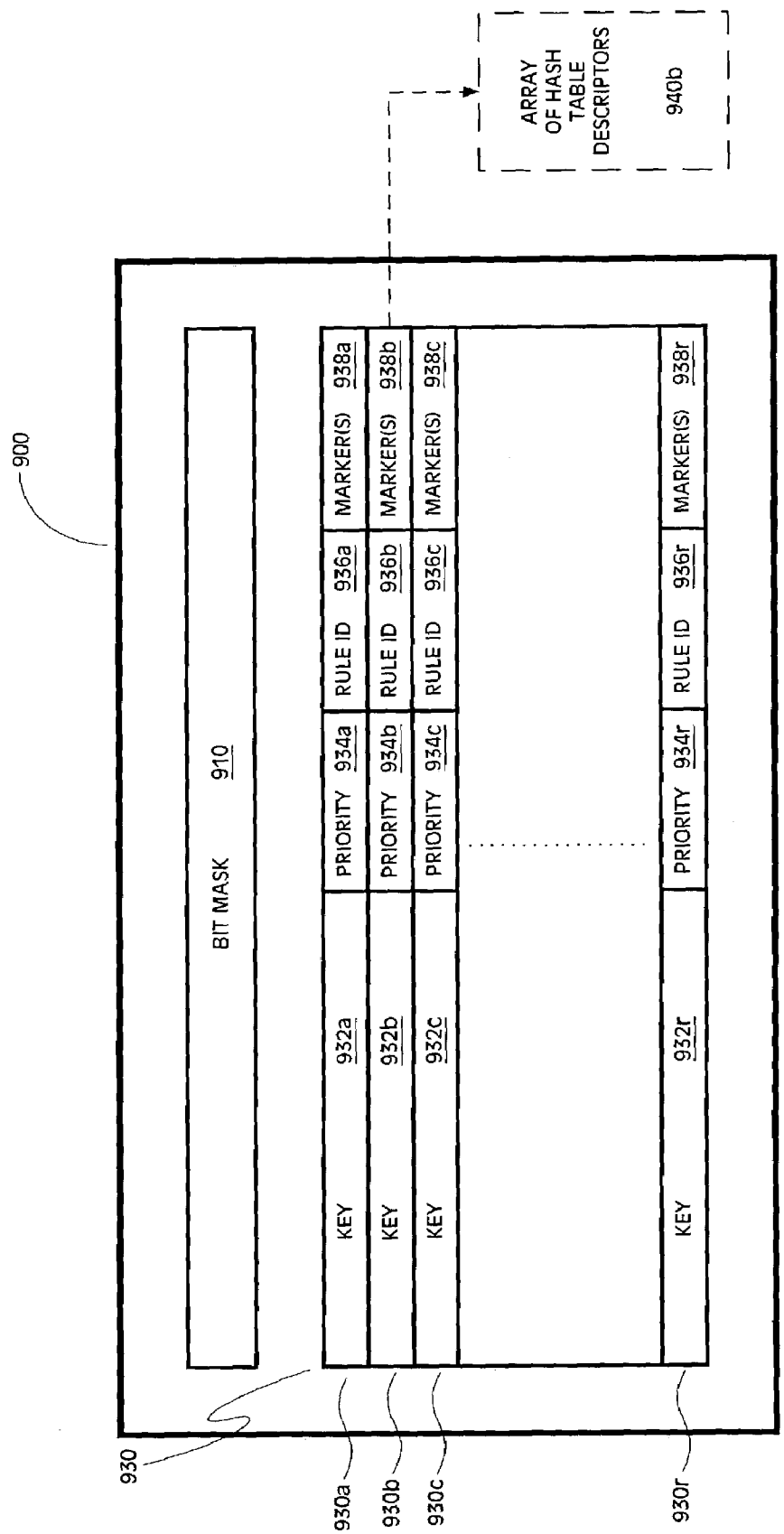
FIG. 9 is a schematic diagram illustrating an embodiment of a hash table, as shown in FIG. 5.

Turning now to FIG. 9, the illustrated hash table 900 includes a bit mask 910, which is the bit mask for all rules in the equivalent set of rules represented by this hash table. Hash table 900 also includes a number of entries 930, including entries 930*a*, 930*b*, . . . , 930*r*. Generally, each of the entries 930*a-r* corresponds to one of the rules 600; however, an entry 930 may be entered in the hash table 900 simply to provide a marker to another hash table, as will be explained below.

In one embodiment, each of the entries 930*a-r* includes a key 932, a priority 934, a rule identifier 936, and one or more markers 938 (i.e., entry 930*a* includes key 932*a*, priority 934*a*, rule identifier 936*a*, and marker(s) 938*a*, and so on). It should be understood, however, that FIG. 9 presents but one example of the make-up of a hash table and, further, that the entry 930 of hash table 900 may include other information. For example, an entry 930 may include a pointer for chaining in the event of collisions, as well as other information.

As will be explained below, if a rule has a bit mask matching the bit mask 910 of a hash table 900, the search agent 530 will compare the rule against each entry 930 in this hash table to look for a match, and it is the key 932 of each entry 930 that is used in this comparison. Essentially, the keys 932 provide a mechanism for indexing and retrieving rules within the hash table data structure 520. The priority 634 gives the priority of a rule corresponding to an entry 630, and the rule identifier 636 identifies the corresponding rule (e.g., a memory location or other identifier of the rule in rule database 510).

As noted above, one or more markers 938 may also be present in each entry 930 of hash table 900. When searching the hash table data structure 520 for a rule corresponding to a received packet, if there is a match between this packet an en entry 930 of the hash table, the marker (or markers) 938 of that entry is used to identify other hash tables that need to be searched. These additional hash tables that are to be searched are "descendants" of the hash table, which hash table is an "ancestor" to all it's descendants, as will be explained in greater detail below. Generally, a marker 938 comprises a pointer to a memory location of the other hash table. However, in another embodiment, a marker 938 identifies a memory location of an array of hash table descriptors 940 (i.e., entry 930*b* has a corresponding array of descriptors 940*b*, and so on). The array of descriptors 940 includes a number of descriptors, each identifying a memory location of another hash table. An entry 930 of hash table 900 may include any desired number of markers 938. In one embodiment, a threshold number of markers is set for the entries of the hash tables, such that markers can be "pushed" lower down into the forest of hash tables data structure (although, in some instances, a marker may still be placed in an entry even though the threshold is exceeded). The use of a threshold to determine at what level to enter a marker in the forest of hash tables data structure is explained in greater detail below.

Figure 10A:
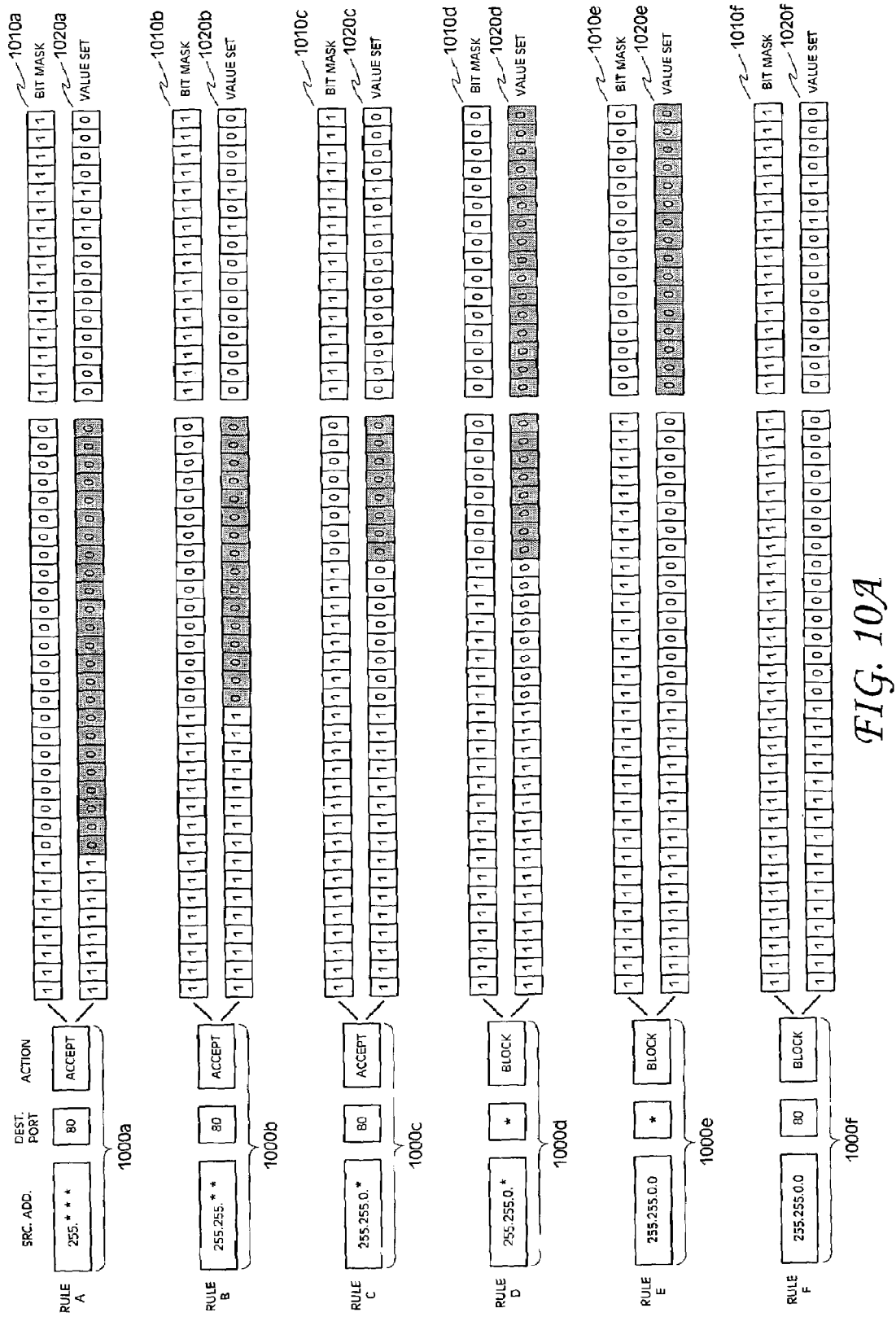
FIGS. 10A-10C present schematic diagrams, each of the diagrams illustrating an embodiment of a rule and the corresponding bit mask and value set.

Referring now to FIG. 10A, a number of rules are shown, including rules 1000*a* (Rule A), 1000*b* (Rule B), 1000*c* (Rule C), 1000*d* (Rule D), 1000*e* (Rule e), and 1000*f* (Rule F). The bit mask and value set for each rule are also shown in FIG. 10A (i.e., rule 1000*a* includes bit mask 1010*a* and value set 1020*a*, and so on). In FIG. 10A (and FIGS. 10B and 10C), shading is again used in the value sets to distinguish those bits that a rule does "not care for" (i.e., those bits corresponding to a "0-bit" in the bit mask) from those bits the rule does "care for" (i.e., those bits corresponding to a "1-bit" in the bit mask).

Each of the rules 1000*a-f* specifies a source address and a destination port—i.e., each of the rules 1000*a-f* has a dimension of two (2). The rules 1000*a-f* of FIG. 10A (as well as rules 1000*g-r* of FIGS. 10B and 10C) are used herein to present a simple example illustrating the disclosed embodiments of a packet classifier 500. However, it should be understood that the disclosed embodiments of the packet classifier may be applied to rules of any dimension (e.g., a dimension of five, as shown in FIGS. 6 through 7I, as well as other dimensions).

Figure 11:
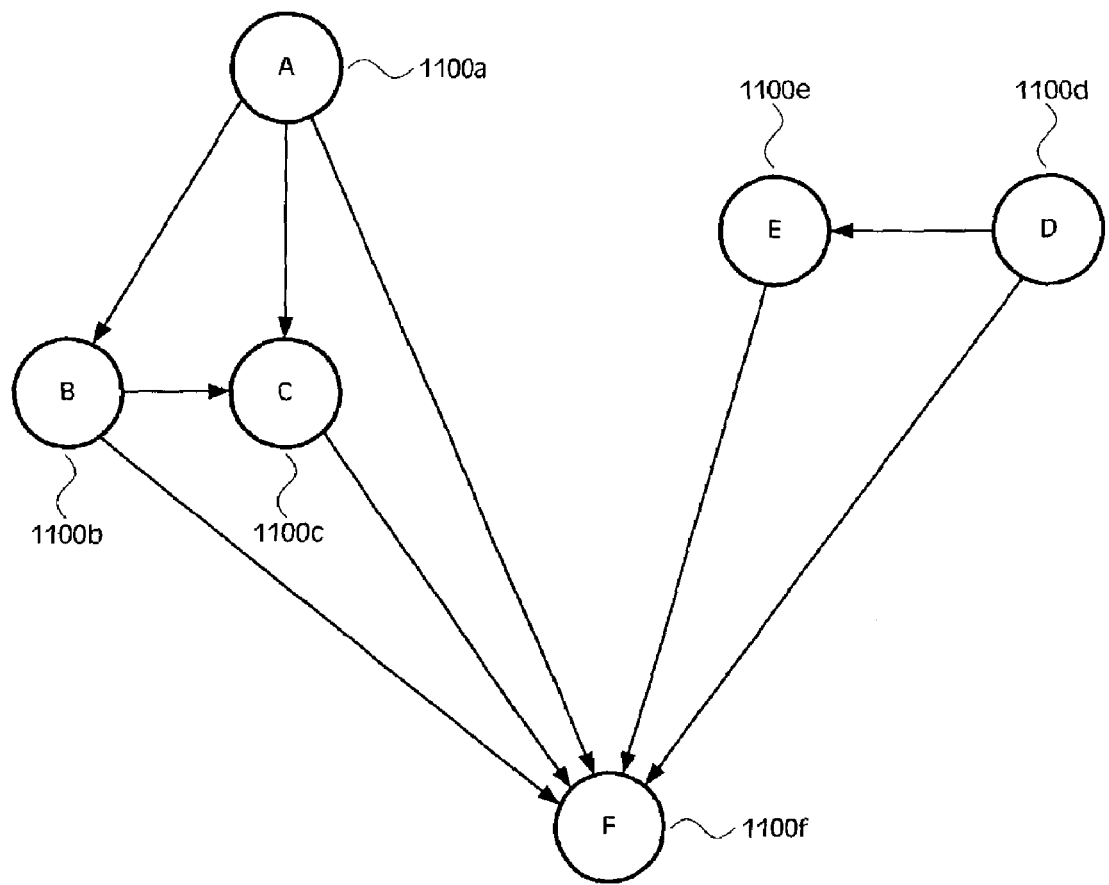
FIG. 11 is a schematic diagram illustrating the ancestor-descendant relationships for the rules shown in FIG. 10A.

A first rule is a "descendant" of a second rule if the second rule—i.e., the "ancestor" of the first rule—has a bit mask comprising a subset of the first rule's bit mask. The bit mask of the second rule is a subset of the bit mask of the first rule if the second rule's bit mask includes at least one set bit (e.g., a "1-bit") in common with the first rule's bit mask. For example, referring to FIG. 10A, rule 1000*b* (Rule B) is a descendant of rule 1000*a* (Rule A) and, likewise, Rule A is an ancestor to Rule B. A rule may have a plurality of descendants, and a rule may also have multiple ancestors. Further, a rule may have both an ancestor (or ancestors) and a descendant (or descendants). This ancestor-descendant relationship for rules 1000*a-f* is shown in FIG. 11. As illustrated in this figure, Rule F is a descendant of each of Rules A, B, C, D, and E. Rules B and C, while each is an ancestor to Rule F, are descendants of Rule A, whereas Rule B is also an ancestor of Rule C. Rule E, while being an ancestor to rule F, is also a descendant of Rule D. Rules A and D, which have no ancestors, are referred to herein as "root nodes" (or "root hash tables").

Figure 12:
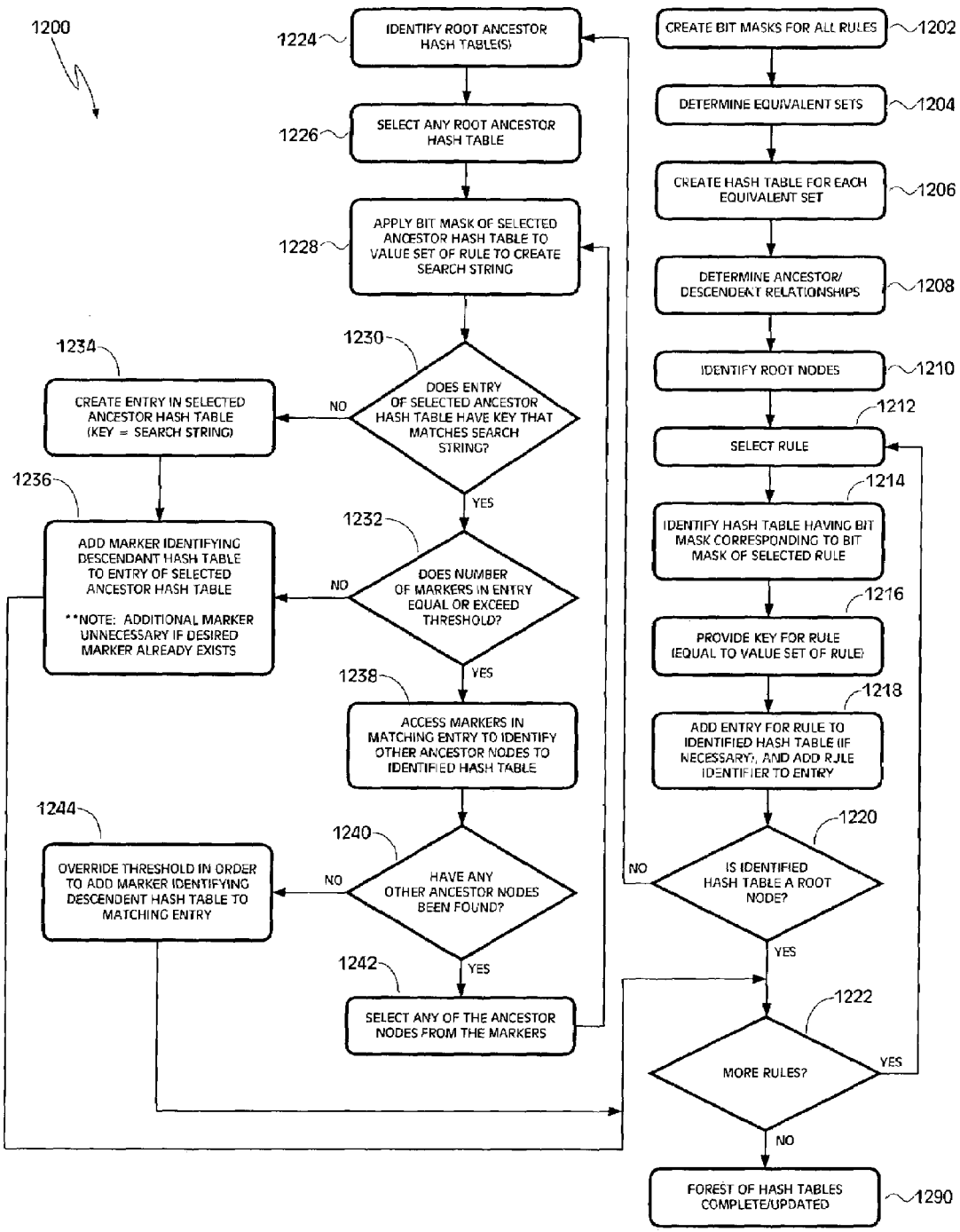
FIG. 12 is a block diagram illustrating an embodiment of a method of constructing a forest of hash tables data structure.

Shown in FIG. 12 is an embodiment of a method 1200 for constructing a forest of hash tables data structure (e.g., hash table data structure 520 of FIG. 5). The method of FIG. 12 is illustrated and described below with respect to rules 1000*a* through 1000*f* (i.e., Rules A through F) of FIG. 10A, as well as rules 1000*g* through 1000*r* (i.e., Rules G through R) of FIGS. 10B and 10C, and the hash tables of FIGS. 13A through 13F (i.e., Hash Tables A through F). Thus, in the example described below, the rule database 510 initially includes Rules A through R. Also, the threshold number of markers for an entry of a hash table is set equal to one (1) for this example.

Figure 10B:
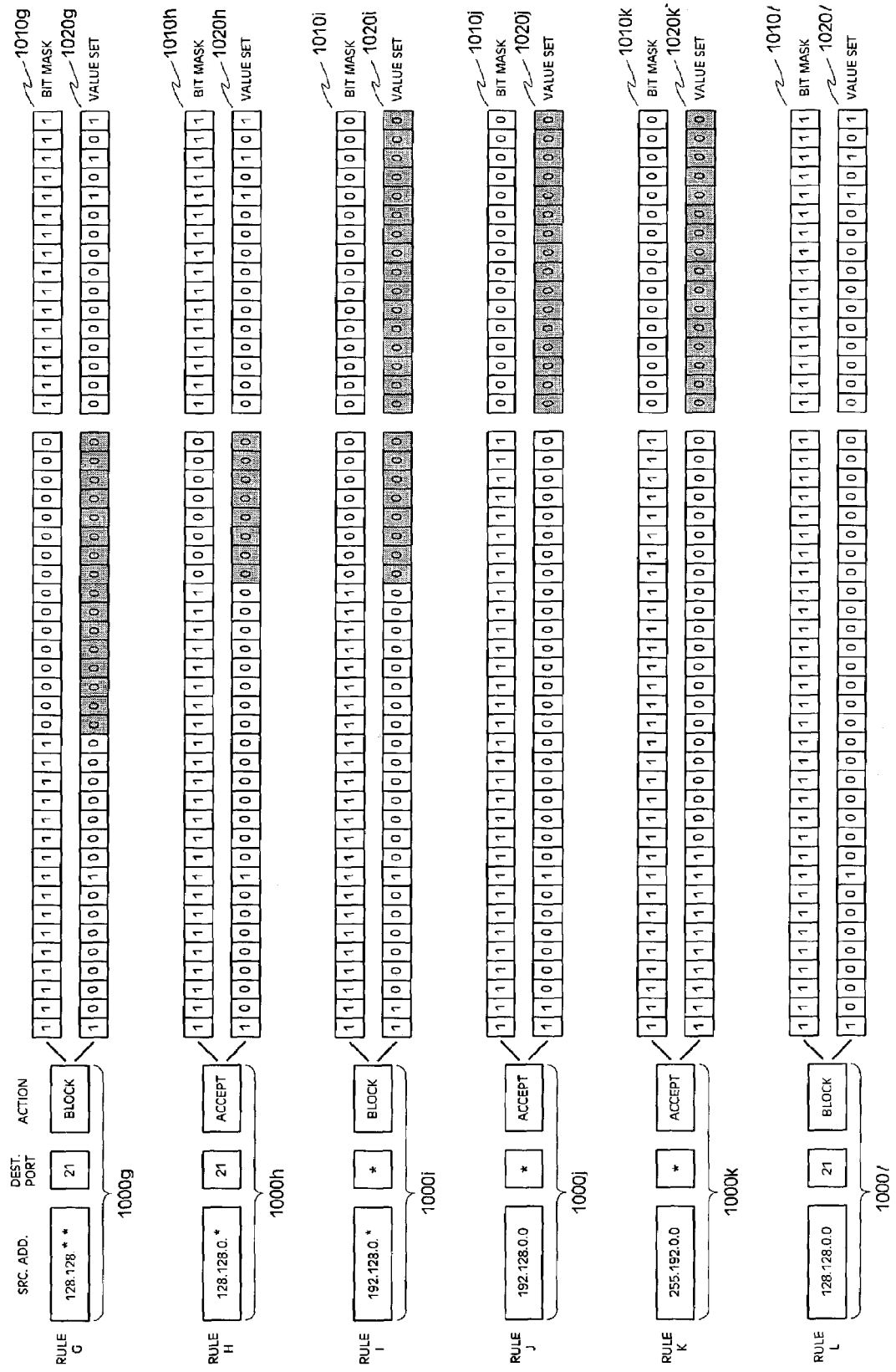
Figure 10C:
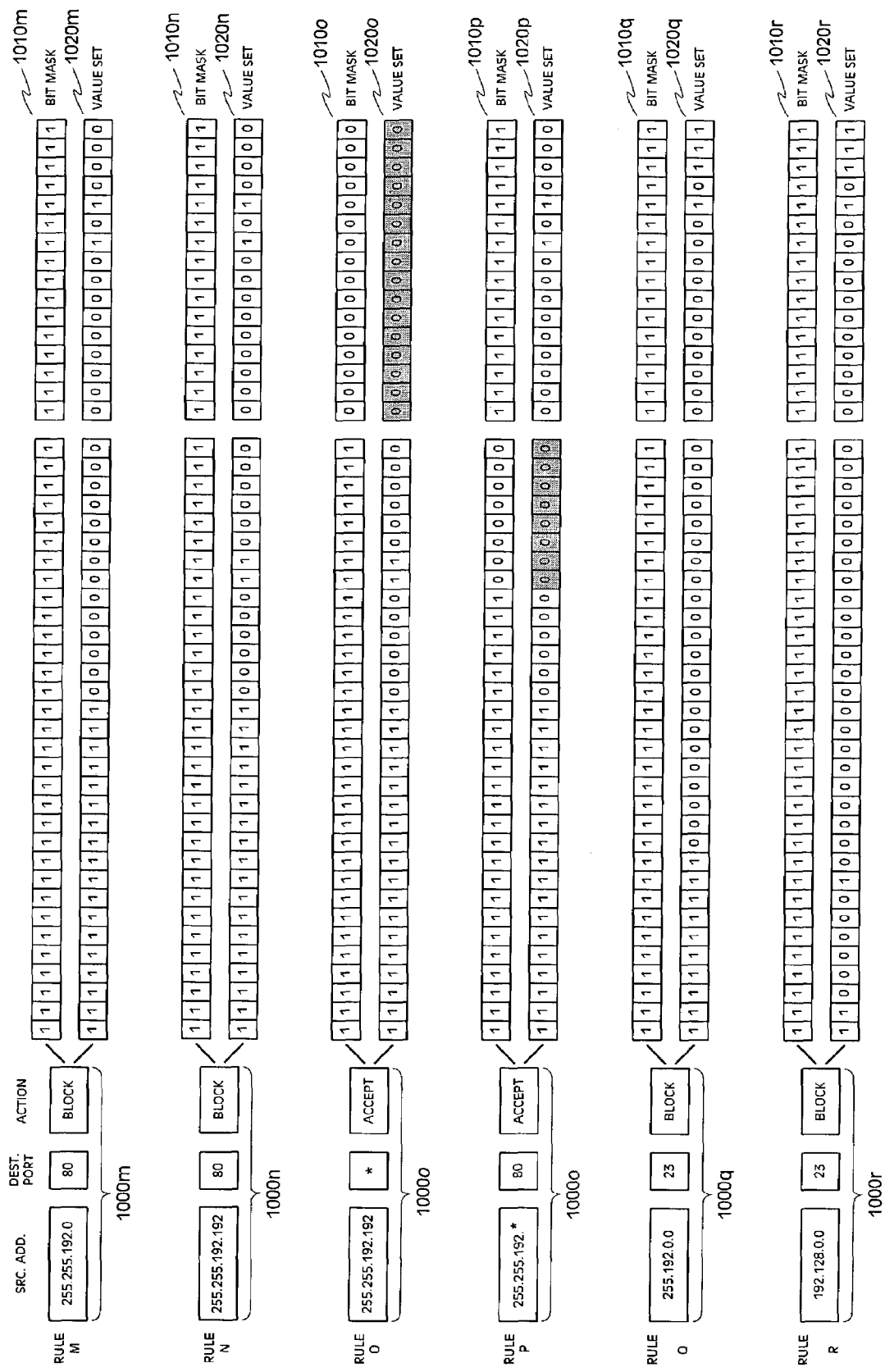

Referring to block 1202 in FIG. 12, a bit mask is created for each of the rules. The respective bit masks for Rules A through R are shown in FIGS. 10A-C (i.e., Rule A has bit mask 1010*a*, Rule B has bit mask 1010*b*, and so on). As shown at block 1204, equivalent sets of rules are then determined. Again, all rules in an equivalent set have the same bit mask. For this example, there are six (6) equivalent sets, represented by the bit masks 1010*a* through 1100*f* of Rules A through F, as each of the bit masks 1010*g-r* of Rules G through R, respectively, is equivalent to one of bit masks 1010*a-f*.

With reference to block 1206 in FIG. 12, a hash table is then created for each equivalent set. Thus, there will be six (6) hash tables, one for each of the bit masks 1010*a* through 1010*f*, which hash tables are shown in FIGS. 13A through 13F, respectively. Referring to these figures, hash table 1300*a* (i.e., Hash Table A) includes bit mask 1010*a*, hash table 1300*b* (i.e., Hash Table B) includes bit mask 1010*b*, hash table 1300*c* (i.e., Hash Table C) includes bit mask 1010*c*, hash table 1300*d* (i.e., Hash Table D) includes bit mask 1010*d*, hash table 1300*e* (i.e., Hash Table E) includes bit mask 1010*e*, and hash table 1300*f* (i.e., Hash Table F) includes bit mask 1010*f*. Again, each of Rules G through Q has a bit mask that is equivalent to one of these six bit masks. It should be noted that, although the fields making up a rule, as well as the components of a rule's bit mask and value set, are typically concatenated end-to-end, spaces have been provided in the bit masks (and keys) of FIGS. 13A-F for ease of understanding.

Referring to blocks 1208 and 1210, ancestor-descendent relationships are determined for the hash tables, and the root nodes are identified. The ancestor-descendent relationship for these equivalent sets (i.e., for the hash tables shown in FIGS. 13A-13F) is that illustrated in FIG. 11. The root nodes are the equivalent set of Hash Table A and the equivalent set of Hash Table D.

Referring now to block 1212 of FIG. 12, a rule is selected. Rule A is selected first (for ease of understanding in this example, the rules will be selected in alphabetical order; however, it should be understand that the order in which the rules are processed is arbitrary). The hash table having a bit mask matching the bit mask of the selected rule is identified, as shown at block 1214. For Rule A, this hash table is Hash Table A. A key is then provided for the selected rule, which is illustrated at block 1216. Generally, the key used to enter a rule into the hash table data structure 520 comprises that rule's value set. As shown at block 1218, an entry for the rule is added to the hash table. This entry will include the new key, as well as a rule identifier. Referring to FIG. 13A, a first entry 1331*a* has been placed in Hash Table A, this entry 1331*a* including the new key and a rule identifier (e.g., a pointer identifying a memory location of Rule A). Note that, in FIG. 13A (and FIGS. 13B-F), the keys do not include shading to distinguish bits that a rule does "not care for" from those bits the rule does "care for".

Referring to block 1220, it is then determined whether this hash table (i.e., the hash table to which the entry for the current rule has been added) is a root hash table. Hash Table A is a root hash table (see FIG. 11). Because Rule A has been added to a root node, no markers are necessary, and the method proceeds. The above-described procedure is then repeated for each rule in the rule database 510. Thus, if there are more rules—see block 1222—another rule is then selected, and the process is repeated (i.e., refer back to block 1212 and repeat block 1212 and subsequent blocks, as necessary). In our example, there are additional rules to consider, and another rule (e.g., Rule B) is selected. However, if there are no more rules, the forest of hash tables data structure 520 has been completed and/or updated (see block 1290).

Rule B is now selected (see block 1212) and the hash table having a bit mask corresponding to Rule B's bit mask—i.e., Hash Table B—is identified (see block 1214). A key for Rule B is provided (see block 1216), and an entry including this key added to Hash Table B (see block 1218). As shown in FIG. 13B, a first entry 133 1*b* has been added to Hash Table B, and this entry 1331*b* includes a key (i.e., the value set 1020*b* of Rule B) and a rule identifier for Rule B (see block 1218). Referring again to block 1220, Hash Table B is not a root node (see FIG. 11) and, therefore, a marker will be added to the hash table data structure.

Referring now to block 1224 in FIG. 12, the root ancestor hash tables of the hash table (e.g., Hash Table B in this example) to which the current rule is being added are identified. If there are more than one ancestor hash tables that are root nodes, one of the root ancestor hash tables is selected, as shown at block 1226. Where multiple root ancestor nodes are present, any of these root nodes may be selected, either at random or using a specified policy. Hash Table B has only one root-node ancestor, Hash Table A, and this root ancestor hash table is selected.

As shown at block 1228, a search string is created. The search string is generated by performing an "AND" operation between the bit mask of the selected ancestor hash table and the value set of the selected rule. Thus, for Rule B, the search string is created by performing the "AND" operation between bit mask 1010*a* of Hash Table A and value set 1020*b* of Rule B, wherein the result produces the search string "11111111 00000000 00000000 00000000 000000000101000". This search string is then compared against each entry of the selected ancestor hash table to determine whether the search string matches the key of any entry, which is shown at block 1230. In our example, the search string matches the key of the first entry 1331*a* of Hash Table A.

If a matching entry is identified (see block 1230), it is determined whether the matching entry has a number of markers that meets or exceeds the allowed threshold number of markers per entry, as shown at block 1232. Returning to the example, there would be no markers in the first entry 1331*a* of Hash Table A at this point and, therefore, the threshold has not been reached. As illustrated at block 1236, if the threshold is not exceeded, a marker identifying the descendent hash table is added to the matching entry of the ancestor hash table. This marker identifies the descendent hash table, thereby indicating that the descendent hash table needs to be searched any time there is a "hit" at this entry of the ancestor hash table (embodiments of a search method are described below in FIGS. 15A and 15B). Accordingly, in our example, a marker for Hash Table B is placed in the first entry 1331*a* of the root Hash Table A. The circumstance where the threshold is met or exceeded (see block 1232) is discussed below (see blocks 1238 through 1244 in FIG. 12).

Note that, when the selected ancestor hash table does not have an entry matching the search string (see block 1230), an entry may be created in the ancestor hash table, as shown at block 1234. The key for this new entry will be equivalent to the search string created by applying the bit mask of the selected ancestor hash table to the value set of the current rule (see block 1228). A marker pointing to the descendant hash table is then placed in this newly created entry, which is again shown at block 1236. It should be noted here that, where the ancestor does not have an entry matching the search string, a new entry is created in the ancestor hash table for inclusion of a marker. Thus, it is possible to have an entry in a hash table that, while identifying additional hash tables to search, does not directly correspond to any rule.

After the addition of any marker, the method again looks at whether there are additional rules to consider (see block 1220) and, if there are one or more other rules, one of these rules is selected (see block 1212). The above-described procedure is then repeated. In our example, Rule C is selected next. The bit mask 1010*c* of Hash Table C matches the bit mask of Rule C, and a first entry 1331*c* is entered into Hash Table C for this rule. The key of entry 1331*c* comprises-the value set 1020c of Rule C, and the rule identifier of this entry identifies Rule C. Because Hash Table C is not a root node (see block 1220), a marker for Rule C needs to be entered in the data structure.

The only root node ancestor hash table to Hash Table C is Hash Table A (see block 1224), and this root node is selected (see block 1226). Applying the bit mask 1010a of Hash Table A to the value set 1020c of Rule C to create a search string (see block 1228), and comparing this search string against each entry of Hash Table A yields a match with the key of the first entry 1331a of Hash Table A (see block 1230). Referring again to block 1232, the number of markers in the first entry 1331a of Hash Table A is one (i.e., a maker to Hash Table B), which equals the threshold of one (1), and the addition of another marker at this entry will exceed this threshold. Thus, the method will attempt to "push" the marker farther down into the hash table data structure to a hash table beneath the root node.

Referring now to block 1238, the marker (or markers) in the matching entry of the selected ancestor hash table are accessed in order to identify other ancestor nodes (i.e., ancestors of the hash table into which the current rule has been entered) into which the new marker may potentially be placed. In our example, the first entry 1331a of Hash Table A includes a marker to Hash Table B. If any other ancestor nodes are found in the accessed markers—see block 1240—any of these ancestor nodes is selected, as shown at block 1242. Returning again to the example, Hash Table B is selected.

Returning again to block 1228 in FIG. 12, the above-described process is repeated for the newly selected ancestor hash table. The bit mask 1010b of Hash Table B is applied to the value set of Rule C (i.e., an "AND" operation) to create a search string, which is "11111111 11111111 00000000 00000000 0000000001010000". This search string is compared against the entries of the selected ancestor hash table (see block 1230), which ancestor is Hash Table B in our example. The search string matches the key of the first entry 1331b of Hash Table B. At this point, there is no other markers in this entry (see block 1232), and a marker for Hash Table C is added to the first entry 1331b of Hash Table B (see block 1236), which is shown in FIG. 13B.

Another rule, Rule D, is selected (see blocks 1222 and 1212), and the method continues. The bit mask 1010d of Rule D matches Hash Table D's bit mask, and an entry 1331d is entered into Hash Table D for Rule D (see blocks 1214 through 1218), as shown in FIG. 13D. This entry includes as a key the value set 1020d of Rule D, as well as a rule identifier for this rule. Because Hash Table D is a root node, an additional marker is not necessary (see block 1220).

Rule E is now selected, which has a bit mask 1010e matching that of Hash Table E. An entry 1331e is placed in Hash Table E (see FIG. 13E) for Rule E, this entry including a key (i.e., the value set 1020e of this rule) and a rule identifier for Rule E. Hash Table E is not a root node (see block 1220), and the identified root nodes includes only a single root ancestor (see block 1224), which is Hash Table D. Hash Table D is selected (see block 1226), and a search string is created based upon the bit mask 1010d of Hash Table D and the value set 1020e of Rule E (see block 1228), which search string is compared against the entries of Hash Table D (see block 1230). The search string (i.e., "11111111 11111111 00000000 00000000 0000000000000000") matches the key in the first entry 1331d of Hash Table D and, since this entry includes no markers at this point (see block 1232), a marker to Hash Table E is placed in the first entry 1331d of this hash table, as shown in FIG. 13D.

Selecting Rule F (see blocks 1222, 1212), which has a bit mask 1010f matching that of Hash Table F, an entry 1331f is entered into Hash Table F for rule F, as shown in FIG. 13F. Entry 1331f of Hash Table F includes a key (the value set 1020f of Rule F) and a rule identifier for Rule F. Hash Table F is not a root node (see block 1220) and, therefore, a marker will be added to the hash table data structure. Hash Table F has multiple root nodes, which are Hash Table A and Hash Table D (see block 1224), and Hash Table A is selected to receive the marker (see block 1226). Again, either of these root nodes can be selected. A search string is created by applying the bit mask 1010a of Hash Table A to the value set 1020f of Rule F (see block 1228), and this search string (i.e., "11111111 00000000 00000000 00000000 0000000001010000") matches the first entry 1331a of Hash Table A (see block 1230). However, this entry 1331a includes one marker—i.e., an earlier entered marker to Hash Table B—and the addition of another marker at this entry would exceed the threshold (see block 1232).

The markers in the matching entry 1331a of Hash Table A are accessed to identify other ancestors of Hash Table F (see block 1238), which yields a marker to Hash Table B. Hash Table B is then selected (see blocks 1240, 1242), and a search string created based upon the bit mask 1010b of this hash table and the value set 1020f of Rule F (the rule currently being considered). This search string (i.e., "11111111 11111111 00000000 00000000 0000000001010000") is compared against the entries of Hash Table B (see block 1230), and a match is found at the first entry 1331b of Hash Table B. However, this entry 1331b of Hash Table B also includes a marker (i.e., a marker to Hash Table C), and the addition of another marker would violate the threshold number of markers for an entry (see block 1232). Thus, the markers in the matching entry of Hash Table B are accessed to reveal additional ancestors to Hash Table F (see block 1238), which leads to Hash Table C (note that had the matching entry in Hash Table A included other markers to nodes in addition to Hash Table B, those markers would also be considered).

Hash Table C is then selected (see block 1240, 1242), and a search string created by applying the bit mask 101 0c of this hash table to the value set 1020f of Rule F (see block 1228). Comparing this search string (i.e., "11111111 11111111 00000000 0000000 0000000001010000") against Hash Table C will yield a match at the first entry 1331c of this hash table (see block 1230). There are presently no markers in this entry (see block 1232), and a marker to Hash Table F is added to the first entry 1331c of Hash Table C (see block 1236), as shown in FIG. 13C. Thus, by accessing the markers in the selected root node to identify other ancestor hash tables and, further, by accessing any markers in these ancestors to identify additional ancestors, the marker to Hash Table F (which is being entered for Rule F) is "pushed" further down into the hash table data structure.

Rule G (see FIG. 10B) is now selected. Rule G has a bit mask 1010g that is the same as bit mask 1101b of Hash Table B. Thus an entry 1332b for Rule G is entered into Hash Table B, the entry 1332b including a key (i.e., the value set 1020g of Rule G) and a rule identifier for Rule G. Hash Table B, which is not a root node, has one root node ancestor in Hash Table A, and another marker for Hash Table B is added to Hash Table A. To add the marker, a search string is created by performing an "AND" operation between the bit mask 1010a of Hash Table A and the value set 1020g of Rule G. This search string (i.e., "10000000 00000000 00000000 00000000 0000000000010101") is compared against each entry of Hash Table A; however, at this point, there is no matching entry for this search string. Thus, a second entry 1332a is created in Hash Table A, wherein the key of this entry is the search string (see blocks 1230, 1234, 1236 in FIG. 12). A marker for Hash Table B is then entered in the new entry 1332*a* of Hash Table A. Note that the second entry 1332*a* of Hash Table A has no rule identifier.

Rule H is selected next. This rule has a bit mask 1010*h* matching the bit mask 1010*c* of Hash Table C, and an entry 1332*c* is entered in this hash table for Rule H. The key for the second entry 1332*c* of Hash Table C is the value set 1020*h* of Rule H, and this entry also includes a rule identifier for Rule H. Hash Table C has one root ancestor in Hash Table A, and a search string is created by performing an "AND" operation between the bit mask 1010*a* of Hash Table A and the value set 1020*h* of Rule H. This search string (i.e., "10000000 00000000 00000000 00000000 0000000000010101") matches the key at the second entry 1332*a* of Hash Table A, where a marker to Hash Table B was previously entered (see FIG. 13A). The addition of another marker to entry 1332*a* of Hash Table A will exceed the threshold; therefore, the markers in this entry (i.e., the marker to Hash Table B) are accessed to identify additional ancestors. Hash Table B is then selected (see blocks 1240, 1242), and a search string created by applying the bit mask 1010*b* of Hash Table B to the value set 1020*h* of Rule H. This search string.(i.e., "10000000 10000000 00000000 00000000 0000000000010101") matches the second entry 1332*b* of Hash Table B, which contains no markers at this point. Accordingly, an appropriate marker is added to this entry 1332*b* of Hash Table B (see FIG. 13B).

Rule I is now considered. Rule I has a bit mask 1010*i* that matches Hash Table D's bit mask 1010*d*, and an entry 1332*d* is entered into Hash Table D for this rule, wherein this entry 1332*d* includes a key (i.e., the value set 1020*i* for Rule I) and a rule identifier for Rule I. Hash Table D is a root node and, therefore, no additional marker is needed.

Rule J, which is selected next in our example, has a bit mask 1010*j* matching the bit mask 1010*e* of Hash Table E. A key (i.e., the value set 1020*j* of Rule J) and a rule identifier for Rule J are entered into a new entry 1332*e* of Hash Table E. Hash Table E has one root ancestor in Hash Table D (see FIG. 1), and this root node is selected to potentially receive a new marker. An "AND" operation between the bit mask 1010*d* of Hash Table D and the value set 1020*j* of Rule J produces a search string (i.e., "11000000 10000000 00000000 00000000 0000000000000000"), which string is then compared against each entry of Hash Table D. The search string matches the key of the second entry 1332*d* of Hash Table D, and a marker to Hash Table E is added to this entry.

Rule K is selected, and this rule has a bit mask 1010*k* that also matches the bit mask 1010*e* of Hash Table E, and an entry 1333*e* is added to Hash Table E for this rule. A key and rule identifier for Rule K are placed in this entry 1333*e*, wherein the key comprises the value set 1020*k* of Rule K. Again, the root ancestor to Hash Table E is Hash Table D. Performing an "AND" operation between the bit mask 1010*d* of Hash Table D and the value set 1020*k* of Rule K produces a search string (i.e., "11111111 11000000 00000000 00000000 0000000000000000"). Comparing this search string against each entry of Hash Table D yields no matches at this time; thus, a new entry 1333*d* is created in Hash Table D (see blocks 1230, 1234 in FIG. 12). The third entry 1333*d* of Hash Table D includes, as a key, the previously created search string. A marker for Hash Table E is then added to this entry 1333*d* of Hash Table D. However, at this point, the entry 1333*d* of Hash Table D does not include a rule identifier.

Rule L, which is now selected, has a bit mask 1010*l* that matches the bit mask 1010*f* of Hash Table F. Accordingly, an entry 1332*f* for Rule L is entered into Hash Table F, the entry 1332*f* including a key.(i.e., the value set 1020*l* of Rule L) and a rule identifier for this rule. As noted above, Hash Table F is not a root node and, in fact, has multiple root node ancestors in Hash Tables A and D. Either of these root nodes can be selected (see block 1226), and Hash Table A is chosen. Creating a search string based upon Hash Table A's bit mask 1010*a* and Rule L's value set 1020*l* and comparing this search string (i.e., "10000000 0000000 00000000 00000000 0000000000010101") to Hash Table A will yield a match at the second entry 1332*a*. However, this entry 1332*a* of Hash Table A includes one marker (to Hash Table B), and the addition of another marker will exceed the threshold (see block 1232). The markers in the matching entry 1332*a* of Hash Table A are accessed to reveal any additional ancestors, which in our example will lead to Hash Table B. Generating a search string based upon Hash Table B's bit mask and Rule L's value set and then comparing this search string (i.e., "10000000 10000000 00000000 00000000 0000000000010101") to Hash Table B will yield a match at the second entry 1332*b* of this hash table. The threshold will again be exceeded if a marker is added to matching entry 1332*b* of Hash Table B, and the markers in this entry are accessed to identify other ancestor hash tables (see blocks 1232, 1238, 1240, and 1242 in FIG. 12). The second entry 1332*b* of Hash Table B includes a marker to Hash Table C. Another search string (i.e., "10000000 10000000 00000000 00000000 0000000000010101") is created based upon Hash Table C's bit mask and Rule L's value set and, when compared to the entries of Hash Table C, a match is found at the second entry 1332*c*. A marker to Hash Table F is then entered into the second entry 1332*c* of Hash Table C, as shown in FIG. 13C.

Rule M is selected next (see FIG. 10C). This rule has a bit mask 1010*m* that also matches the bit mask 1010*f* of Hash Table F, and another entry 1333*f* is created in this hash table for Rule M. The entry 1333*f* includes a key (i.e., the value set 1020*m* of Rule M) and the appropriate rule identifier. As previously noted, Hash Table F is not a root node, and one of this hash table's root nodes will be selected to receive a marker. Again, Hash Table F has two root nodes in Hash Tables A and D, and Hash Table A is selected. Following the above described procedure (i.e., blocks 1224 through 1242 of FIG. 12), the marker will be "pushed" down to Hash Table C, where a new entry 1333*c* will be created to receive a marker to Hash Table F (the key of this entry being the search string created by applying the bit mask 1010*c* of Hash Table C to the value set 1020*m* of Rule M). Note that, at this point, the new entry 1333*c* in Hash Table C does not contain a rule identifier.

Rule N, which is considered next, also has a bit mask 1010*n* matching the bit mask 1010*f* of Hash Table F. An entry 1334*f* for Rule N is entered into Hash Table F, this entry including a key (i.e., the value set 1020*n* of Rule N) and a Rule N identifier. As Hash Table F is not a root node, one of Hash Table F's two root nodes (i.e., nodes A and D) will be selected to receive the marker. Root node A is selected. Application of the above-described procedure (i.e., blocks 1228 through 1242) using the appropriate search string will yield a match at entry 1331*a* of Hash Table A, where the threshold would be exceeded by the addition of a marker, and at entry 1331*b* of Hash Table B, where the threshold would also be exceeded by the addition of a marker. Looking to Hash Table C and using the appropriate search string, a match is found at entry 1333*c* of Hash Table C. Entry 1333*c* of Hash Table C already includes a marker to Hash Table F (which is the hash table we are attempting to add a marker for) and, therefore, an additional marker is not required. Note that, in this situation where there is multiple root ancestor nodes, another root node could be selected and a marker to Hash Table F entered in this root node (or one of it's descendents). However, it is desirable to minimize the number of markers, such that the number of hash look-ups is correspondingly minimized during a search of the hash table data structure. Accordingly, when the desired marker is already present in the hash table data structure, an additional marker will generally not be added, which is shown in block 1236 of FIG. 12.

Rule O is now selected. Rule O has a bit mask 1010*o* that also matches the bit mask 1010*e* of Hash Table E, and an entry 1334*e* for this rule is placed in Hash Table E. The new entry 1334*e* includes a key (i.e., the value set 1020*o* for Rule O) and a Rule O identifier. Hash Table E's only root node—Hash Table D—is selected. Applying the bit mask 1010*d* of Hash Table D to the value set 1020*o* of Rule O to create a search string (i.e., "11111111 11111111 11000000 00000000 0000000000000000"), and comparing this search string with the entries of Hash Table D yields a match at entry 1334*d*. However, this entry 1334*d* of Hash Table D already includes a marker (to Hash Table F), and the addition of another marker will exceed the threshold (see block 1232). Further, accessing the markers in entry 1334*d* of Hash Table D (see block 1238) yields no other ancestor hash tables. Note here that Hash Table F, which corresponds to the only marker in entry 1334*d* of Hash Table D, is not an ancestor of Hash Table E (it is a descendent). Thus, all possible ancestor nodes have been considered (see block 1240). Accordingly, as shown at block 1244 of FIG. 12, the threshold is overridden, and a marker to Hash Table E is added to entry 1334*d* of Hash Table D, which entry now has two markers.

Rule P, which is selected next, includes a bit mask 1010*p* that matches the bit mask 1010*c* of Hash Table C. An entry for Rule P is, therefore, needed in Hash Table C. However, note that an earlier created entry—i.e., entry 1333*c* having a marker to Hash Table F—has a key matching the value set 1020*p* of Rule P. Thus, a new entry is not required, and a rule identifier for Rule P is simply added to this entry 1333*c* of Hash Table C (see block 1218 in FIG. 12). Hash Table C has one root node in Hash Table A, and a search string is created by applying the bit mask 1010*a* of this root node to the value set 1020*p* of Rule P. Comparing this search string (i.e., "11111111 00000000 00000000 00000000 0000000001010000") with Hash Table A yields a match at entry 1331*a*, which entry already includes a marker. As the addition of another marker to this entry would exceed the threshold, the markers in this entry are accessed to reveal additional ancestors (i.e., ancestors to Hash Table C). A marker to Hash Table B is found, and a search string is created by applying the bit mask 1010*b* of this hash table to Rule P's value set 1020*p*. This search string (i.e., "11111111 11111111 00000000 00000000 0000000001010000") matches the first entry 1331*b* of Hash Table B, which entry already includes a marker to Hash Table C. Therefore, because the appropriate marker already exists, an additional marker is not entered (see block 1236).

Rule Q is now considered. Rule Q includes a bit mask 1010*q* that matches the bit mask 1010*f* of Hash Table F, and an entry 1335*f* for Rule Q is entered into this hash table, wherein the entry includes the value set 1020*q* as the key and a rule identifier for Rule Q. Hash Table D, which is one of Hash Table F's two root nodes, is selected, and a search string is created based upon the bit mask 1010*d* of this root node and the value set 1020*q* of Rule Q. This search string (i.e., "11111111 11000000 00000000 00000000 0000000000000000") matches the third entry 1333*d* of Hash Table D. This entry 1333*d* of the root node already has a marker (to Hash Table E), and the addition of another marker will exceed the threshold. Accordingly, the markers at the third entry 1333*d* of Hash Table D are accessed to identify other root nodes, which leads to Hash Table E. Another search string is created by applying the bit mask 1010*e* of Hash Table E to Rule Q's value set 1020*q*, and this search string (i.e., "11111111 11000000 00000000 00000000 0000000000000000") is compared to the entries of Hash Table E. A match with the search string is found at entry 1333*e* of Hash Table E (which has no markers at this point), and a marker to Hash Table F is placed in this entry 1333*e*.

Rule R, which is selected next, includes a bit mask 1010*r* that also matches the bit mask 1010*f* of Hash Table F. An entry 1336*f* including the value set 1020*r* as a key and a rule identifier for Rule R is entered into Hash Table F. Hash Table A is selected from Hash Table F's two root nodes, and a search string is created from the bit mask 1010*a* of Hash Table A and Rule R's value set 1020*r*. This search string (i.e., "11000000 00000000 00000000 00000000 0000000000010111") does not match any entry of Hash Table A. Thus, a new entry 1333*a* is created in Hash Table A—this entry 1333*a* having the search string as a key—and a marker to Hash Table F is placed in this entry, as shown in FIG. 13A.

Figure 14:
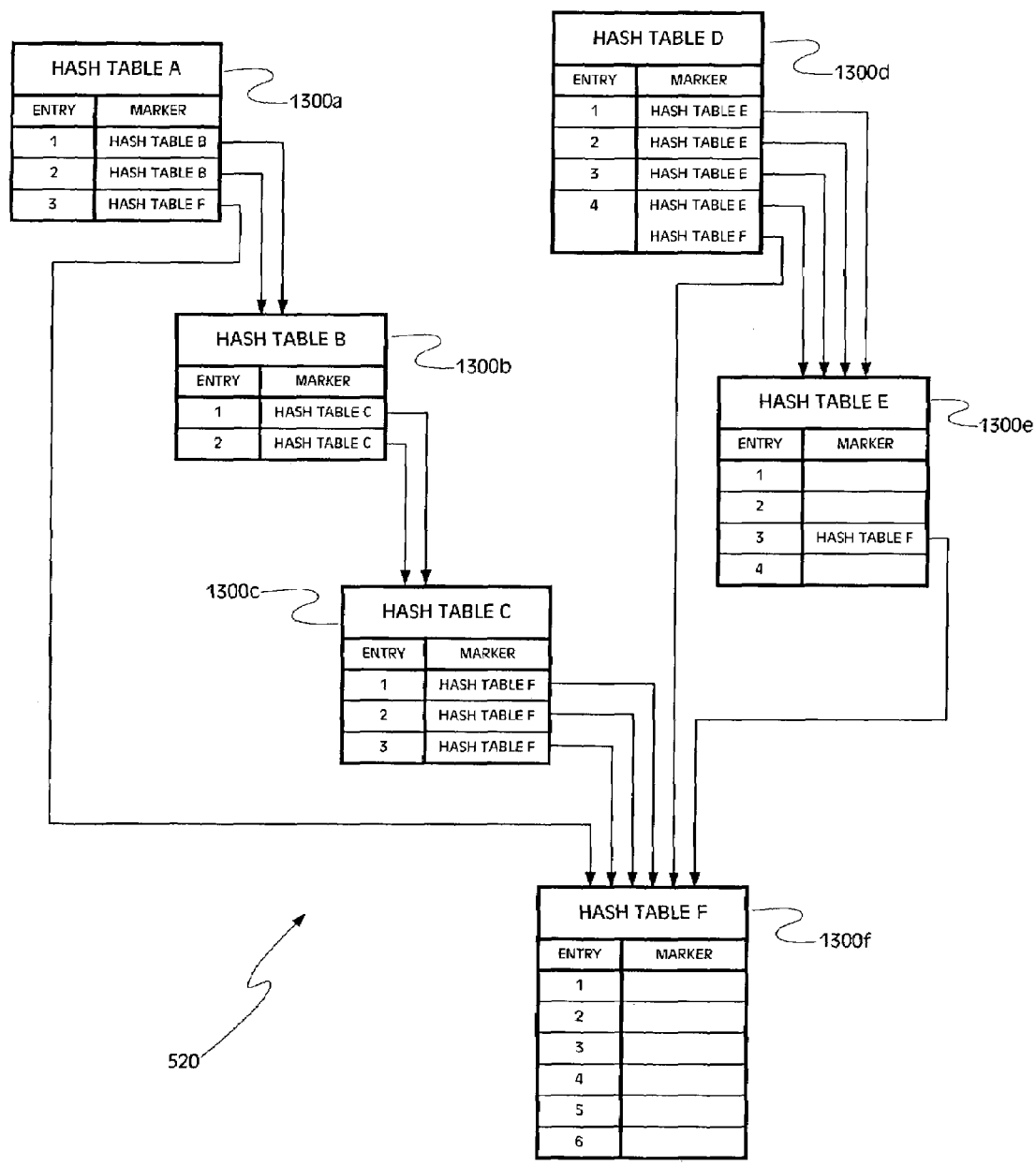
FIG. 14 is a schematic diagram illustrating the forest of hash tables data structure shown in FIGS. 13A-13F.

At this point, all rules have been considered (see block 1222), and the forest of hash tables data structure is complete and/or updated (see block 1290). A schematic view of the forest of hash tables data structure 520 generated during the above-described example is illustrated in FIG. 14 (keys and rule identifiers omitted). This figure illustrates the forest of hash tables structure and how markers are utilized to reference descendant hash tables and, further, the manner in which markers are "pushed" down into lower levels of the hash table data structure. The efficiency provided by the markers and this data structure will be better understood with reference to the search algorithms described below in-FIGS. 15A and 15B. Addition of a rule to the hash table data structure 520 requires the addition of an entry for the rule to a hash table having a matching bit mask, as well as the addition of a marker if the matching hash table is not a root node. Note that addition of a rule could potentially result in creation of a new hash table (e.g., where the new rule has a unique bit mask). If the new hash table is a root, the forest of hash tables data structure may need to be updated to reflect that the new root hash table may have descendants. Deletion of a rule requires deleting the corresponding entry from a hash table and/or the rule's identifier, as well as the removal of any markers added when the rule was originally entered. In one embodiment, the creation and maintenance of the forest of hash tables data structure 520, as described above, is performed by the core 310 of processing device 300 (see FIG. 3).

Figure 15A:
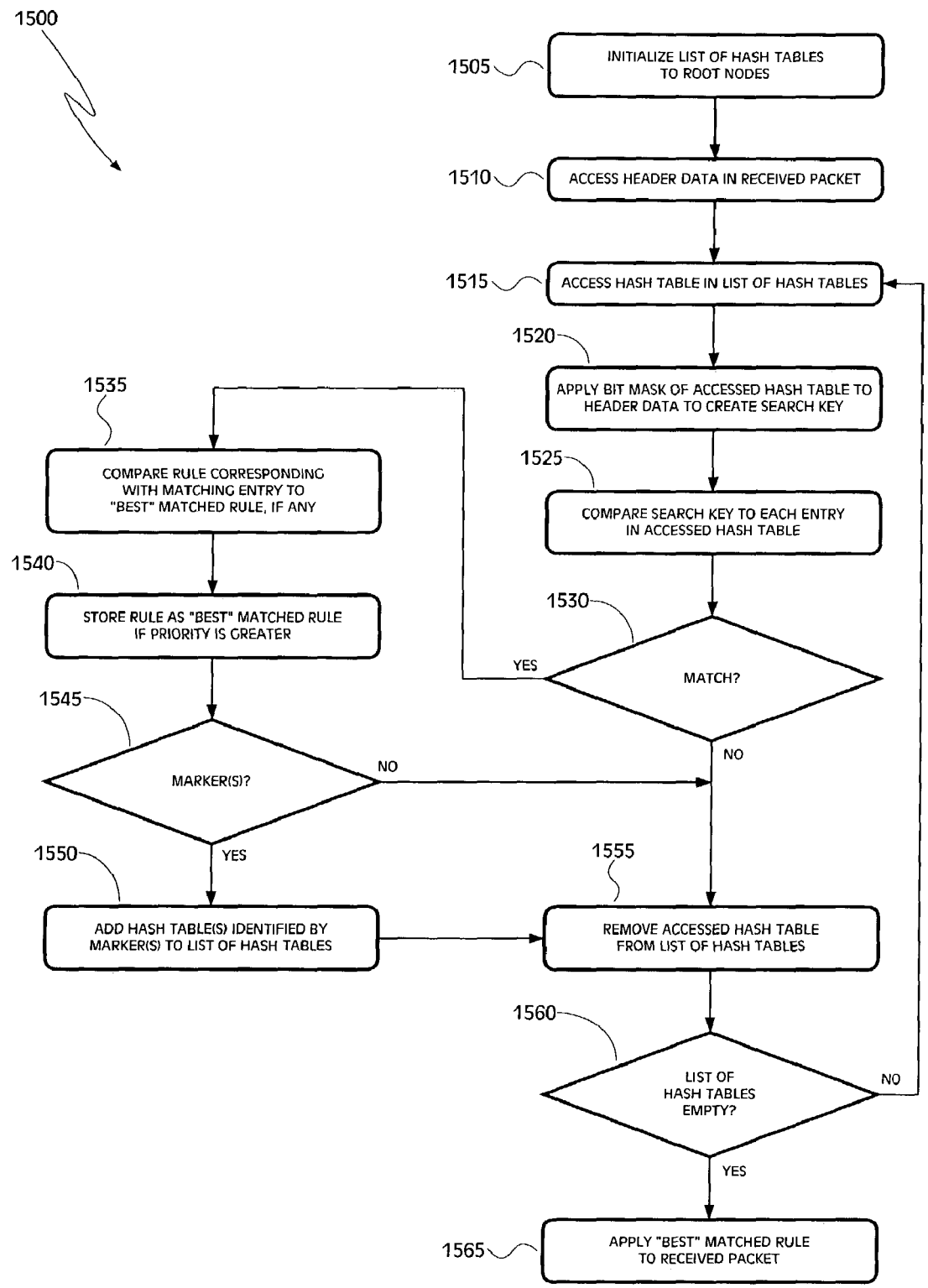
FIG. 15A is a block diagram illustrating an embodiment of a method of searching a forest of hash tables data structure.

Turning now to FIG. 15A, a method 1500 of searching the hash table data structure 520 is illustrated. When a packet is received at router 200, the method 1500 may be used to search the hash table data structure 520 in order to identify the rule that should be applied to the incoming packet. The method 1500 of FIG. 15A is explained in the context of the above example shown and described with respect to FIGS. 10A, 10B, 10C, 11, 13A, 13B, and 14. However, it should be understood that, although the example above utilized rules based upon the source address and destination port, a packet filter or rule may be based upon any suitable information contained in a packet. Further, it should be understood that router 200 may include filters of different dimensions (e.g., router 200 may include filters of dimension five and filters having some other dimension).

Referring to block 1505, the list of hash tables 540 is initialized to the root nodes (nodes A and D in the example above). As shown at block 1510, header data in a received packet is accessed. For our example, the source address and destination port are read. Assume, for example, that the source address is "192.128.0.0" and the destination port is "23". As shown at block 1515, a hash table in the list of hash tables to search 1540 is selected. Hash Table A is selected. The bit mask 1010*a* of Hash Table A is applied (i.e., an "AND" operation) to the accessed header data to create a search key, which is shown at block 1520. The search key for Hash Table A is "11000000 00000000 00000000 00000000 0000000000010111".

The search key is then compared against each entry of the selected hash table, which is illustrated at block 1525. If there is a match—see block 1530—the rule corresponding to the matching entry (i.e., the rule identified by the rule identifier, if any) is compared with the "best" matched rule 550, which is shown at block 1535, and if the priority of the newly identified rule is greater than that of the "best" matched rule, the rule is stored as the best matched rule, as illustrated at block 1540. Returning to the example, the search key matches the key of the third entry 1333*a* of Hash Table A; however, this particular entry contains no rule identifier. Referring to block 1545 in FIG. 15A, it is then determined whether the matching entry includes any markers and, for each marker, the identified hash table is added to the list of hash tables to search 540, as shown at block 1550. The third entry 1333*a* of Hash Table A includes a marker identifying Hash Table F, and Hash Table F is added to the list of hash tables 540.

Referring to block 1555, the accessed hash table—i.e., Hash Table A in our example—is then removed from the list of hash tables to search 540. Note that, were there no markers in the matching entry (see block 1545), the algorithm would proceed to block 1555. Similarly, if there was no match found in the selected hash table (see block 1530), the method would proceed to block 1555, at which point that hash table would be removed from the list of hash tables 540.

If the list of hash tables to search 540 is not empty—see block 1560—another hash table is selected from the list 540, and this hash table is accessed, as shown at block 1515. For the example, Hash Table D is selected from the list of hash tables 540, and this hash table is accessed. The bit mask 1010*d* of Hash Table D is applied to the header data (see block 1520) to create a search key. The search key for. Hash Table D is "11000000 10000000 000000000 0000000 0000000000000000", and this search key is compared against each entry of Hash Table D (see block 1525). For this search key, there is a match at the second entry 1332*d* of Hash Table D (see block 1530), and the rule corresponding to this entry—i.e., Rule I—is compared against the "best" matched rule 550 (see block 1535). At this point, no rule has been stored as the "best" matched rule and, therefore, Rule I is stored as the "best" matched rule. The second entry 1332*d* of Hash Table D includes a marker (see block 1545), and the hash table identified by this marker—i.e., Hash Table E—is added to the list of hash tables to search 540 (see block 1550). Hash Table D is then deleted from the list of hash tables 540 (see block 1555). The list of hash tables 540 now includes Hash Tables E and F, and the "best" matched rule 550 is Rule I.

Another hash table—e.g., Hash Table E—is selected from the list of hash tables 540 and accessed (see blocks 1560 and 1515). The bit mask 1010*e* of Hash Table E is applied to the header data to create a search key—i.e., "11000000 10000000 00000000 00000000 0000000000000000" (see block 1520). The search key is then compared against each entry of Hash Table E (see block 1525), which yields a match at the second entry 1332*e* (see block 1530). The rule corresponding to this entry 1332*e* is Rule J, and Rule J is compared against the "best" matched rule 550—i.e., Rule I—and the rule with the greater priority is stored as the "best" matched rule (see blocks 1535, 1540). The second entry 1332*e* of Hash Table E also includes a marker to Hash Table F, and this hash table is added to the list of hash tables to search 540 (see blocks 1545 and 1550). Note, however, that Hash Table F is already in the list of hash tables 540, so the marker in Hash Table E will have no affect on the list of hash tables 540. Hash Table E is removed from the list of hash tables to search 1555. Thus, the list of hash tables 540 now includes Hash Table F, and the "best" match rule is either Rule I or Rule J, depending upon which has a greater priority.

The final hash table, Hash Table F, in the list of hash tables 540 is then selected and accessed (see block 1515). Applying the bit mask 1010*f* of Hash Table F to the header data creates the search key "11000000 10000000 00000000 00000000 0000000000010111" (see block 1520), and the search key is compared against the entries of Hash Table F (see block 1525), which yields a match at the sixth entry 1336*f* of this hash table (see block 1530). The rule corresponding with this entry 1334*f* is Rule R, and this rule is compared with the "best" matched rule 550 to determine which rule is to be applied to the received packet (see blocks 1535, 1540). No markers are present in Hash Table F (see block 1545), and Hash Table F is removed from the list of hash tables 540 (see block 1555). The list of hash tables to search 540 is now empty (see block 1560), and the "best" matched rule—i.e., the greatest in priority of Rules I, J, and R—can be applied to the received packet, as shown at block 1565.

In our example, any one of three rules (i.e., Rules I, J, and R) may be the "best" matched rule, depending upon which has the greatest priority. Any suitable policy and/or criteria may be utilized to assess the priority of a rule. In one embodiment, as described above, the priority of a rule may be stored along with the rule in that rule's corresponding hash table (see FIG. 9, items 934*a-r*).

Note that, in the example presented above, Hash Tables B and C were not searched. In particular, by starting at the root nodes and accessing only those hash tables identified by markers, unnecessary searches that would yield no results are eliminated. The Hash Tables B and C are, therefore, "pruned" from the search process through the use of markers. Accordingly, a look-up operation into each of the pruned hash tables is eliminated, thereby increasing the speed and efficiency of the search algorithm. Although only two hash tables were pruned in the simple example presented herein, many more hash tables may be pruned in practice, as real-world hash table data structures may includes tens or even hundreds of hash tables.

Figure 15B:
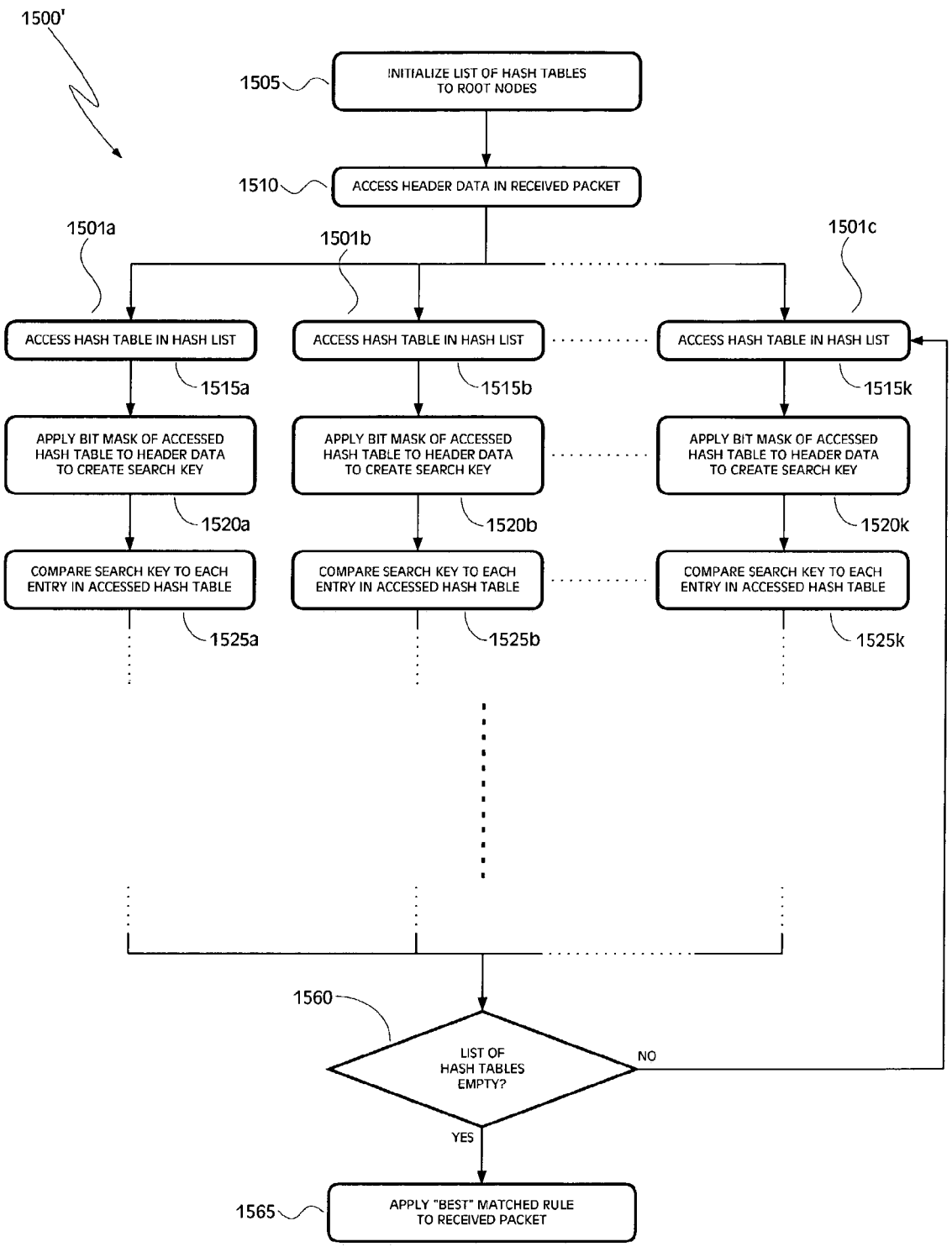
FIG. 15B is a block diagram illustrating another embodiment of the method of searching a forest of hash tables data structure.

Efficiency and speed may be further improved using parallel searches of the hash table data structure 520, and an embodiment of the method of searching the hash table data structure utilizing such parallel search capabilities is illustrated in FIG. 15B. The method 1500' illustrated in FIG. 15B is similar to the method 1500 shown in FIG. 15A, and a discussion of like elements is not repeated.

Referring to FIG. 15B, once the header data has been accessed—see block 1510—this data is used to search a number of hash tables in parallel. The method 1500' then proceeds as described above; however, a number of hash tables are simultaneously accessed and searched. For example, as shown in FIG. 15B, hash tables are accessed in blocks 1510*a*, 1510*b*, . . . , 1510*k*. The algorithm then continues until no hash tables remain in the list of hash tables to search 540. In one embodiment, the method 1500' is implemented on the processing device 300 if FIG. 3, wherein each of the processing engines 320*a-k* performs one of the parallel searches into a hash table (e.g., each of the branches 1501a, 1501b, ..., 1501k of the method 1500' is executed on one of the search engines 320a-k).

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A data structure stored on a computer accessible medium comprising:
   a first bit mask;
   a number of entries, each entry including a key formed using the first bit mask; and
   hash tables representing a root node, wherein at least one of the entries includes a marker, the marker identifying a hash table having a second bit mask, wherein the second bit mask is a descendant of the first bit mask,
   wherein the marker identifies an array of descriptors, one of the descriptors identifying the hash table having the second bit mask.

2. The data structure of claim 1, further comprising:
   a rule identifier associated with one of the entries, the rule identifier identifying a rule associated with the key of the one entry.

3. The data structure of claim 2, further comprising:
   a priority class associated with the one entry, the priority class identifying a priority of the associated rule.

4. The data structure of claim 1, wherein each of the other descriptors are to identify a hash table having a bit mask that is a descendant of the first bit mask.

5. An apparatus comprising:
   a processing system; and
   a memory coupled with the processing system, the memory having a data structure stored therein, the data structure including
   a first bit mask, and
   a number of entries, each entry including a key formed using the first bit mask, wherein at least one of the entries includes a marker, the marker identifying a hash table having a second bit mask, wherein the second bit mask is a descendant of the first bit mask, wherein the marker of the data structure identifies an array of descriptors, one of the descriptors identifying the hash table having the second bit mask.

6. The apparatus of claim 5, wherein the data structure further comprises:
   a rule identifier associated with one of the entries, the rule identifier identifying a rule associated with the key of the one entry.

7. The apparatus of claim 6, wherein the data structure further comprises:
   a priority class associated with the one entry, the priority class identifying a priority of the associated rule.

8. The apparatus of claim 5, wherein each of the other descriptors are to identify a hash table having a bit mask that is a descendant of the first bit mask.

9. The apparatus of claim 5, wherein the memory comprises a dynamic random access memory.

10. The apparatus of claim 5, wherein the processing system includes a number of processing engines.

11. The apparatus of claim 5, wherein the processing system and the memory are located on a single integrated circuit device.

12. A data structure stored on a computer accessible medium comprising:
    a number of hash tables, each hash table including a bit mask and a number of entries, each entry including a key formed using the bit mask, at least one of the hash tables representing a root node; and
    a number of markers, each marker associated with one of the entries of one of the hash tables, the marker of an entry of a hash table identifying another hash table that is a descendant of that hash table, wherein the marker of the entry of the hash table identifies an array of descriptors.

13. The data structure of claim 12, wherein an entry of one of the hash tables is associated with a rule, the entry of the one hash table including a rule identifier for the rule.

14. The data structure of claim 13, wherein the entry of the one hash table further includes a priority associated with the rule.

15. The data structure of claim 12, wherein each of the descriptors are to identify one hash table that is a descendent of that hash table.

16. An apparatus comprising:
    a processing system; and
    a memory coupled with the processing system, the memory having a data structure stored therein, the data structure including
    a number of hash tables, each hash table including a bit mask and a number of entries, each entry including a key formed using the bit mask, at least one of the hash tables representing a root node; and
    a number of markers, each marker associated with one of the entries of one of the hash tables, the marker of an entry of a hash table identifying another hash table that is a descendant of that hash table, wherein the marker of the entry of the hash table identifies an array of descriptors.

17. The apparatus of claim 16, wherein an entry of one of the hash tables is associated with a rule, the entry of the one hash table including a rule identifier for the rule.

18. The apparatus of claim 17, wherein the entry of the one hash table further includes a priority associated with the rule.

19. The apparatus of claim 16, wherein each of the descriptors is to identify one hash table that is a descendent of that hash table.

20. The apparatus of claim 16, wherein the memory comprises a dynamic random access memory.

21. The apparatus of claim 16, wherein the processing system includes a number of processing engines.

22. The apparatus of claim 16, wherein the processing system and the memory are located on a single integrated circuit device.

23. A method comprising:
    selecting from a number of hash tables a hash table having a bit mask corresponding to a bit mask of a rule;
    adding an entry for the rule to the selected hash table;
    if the selected hash table has an ancestor hash table that is a root node, placing a marker in the root ancestor hash table, the marker identifying the selected hash table; and
    creating a search string based upon the rule and a bit mask of the root ancestor hash table.

24. The method of claim 23, wherein the added entry includes a key corresponding to the rule.

25. The method of claim 24, further comprising placing a rule identifier in the added entry, the rule identifier identifying the rule.

26. The method of claim 25, further comprising placing in the added entry a priority associated with the rule.

27. The method of claim 23, further comprising:
comparing the search string with each of a number of entries of the root ancestor hash table to determine whether one of the entries has a key matching the search string.

28. The method of claim 27, further comprising:
if none of the entries of the root ancestor hash table has a key matching the search string, adding a new entry to the root ancestor hash table; and
placing a key in the new entry, the key corresponding to the search string;
wherein the marker identifying the selected hash table is placed in the new entry of the root ancestor hash table.

29. The method of claim 27, wherein an entry of the root ancestor hash table has a key matching the search string, the method further comprising:
placing the marker identifying the selected hash table in the matching entry of the root ancestor hash table if a threshold number of markers will not be exceeded at the matching entry.

30. The method of claim 29, wherein placement of the marker in the matching entry of the root ancestor hash table will exceed the threshold number of markers, the method further comprising:
accessing an existing marker in the matching entry of the root ancestor hash table; and
placing the marker in a hash table identified by the existing marker, wherein the identified hash table is an ancestor to the selected hash table.

31. The method of claim 30, wherein the act of placing the marker in the hash table identified by the existing marker comprises:
creating a search string based upon the rule and a bit mask of the hash table identified by the existing marker; and
comparing the search string with each of a number of entries of the hash table identified by the existing maker, wherein the marker is placed in one of the entries having a key matching the search string.

32. The method of claim 29, wherein placement of the marker in the matching entry of the root ancestor hash table will exceed the threshold number of markers, the method further comprising:
overriding the threshold number of markers; and
placing the marker identifying the selected hash table in the matching entry of the root ancestor hash table.

33. The method of claim 29, wherein the threshold number of markers is one.

34. The method of claim 23, wherein the bit mask of the selected hash table and the bit mask of the rule each comprise a tuple of dimension X.

35. The method of claim 34, wherein the dimension X comprises a number in a range of from 2 to 5.

36. An apparatus comprising:
a memory system having stored thereon a set of instructions; and
a processing system coupled with the memory system, wherein the set of instructions, when executed on the processing system, causes the processing system to
select from a number of hash tables a hash table having a bit mask corresponding to a bit mask of a rule;
add an entry for the rule to the selected hash table; and
if the selected hash table has an ancestor hash table that is a root node, place a marker in the root ancestor hash table, the marker identifying the selected hash table, wherein execution of the set of instructions farther causes the processing system to create a search string based upon the rule and a bit mask of the root ancestor hash table.

37. The apparatus of claim 36, wherein the added entry includes a key corresponding to the rule.

38. The apparatus of claim 37, wherein execution of the set of instructions further causes the processing system to place a rule identifier in the added entry, the rule identifier identifying the rule.

39. The apparatus of claim 38, wherein execution of the set of instructions further causes the processing system to place in the added entry a priority associated with the rule.

40. The apparatus of claim 36, wherein execution of the set of instructions further causes the processing system to compare the search string with each of a number of entries of the root ancestor hash table
to determine whether one of the entries has a key matching the search string.

41. The apparatus of claim 40, wherein execution of the set of instructions further causes the processing system to:
if none of the entries of the root ancestor hash table has a key matching the search string, add a new entry to the root ancestor hash table; and
place a key in the new entry, the key corresponding to the search string;
wherein the-marker identifying the selected hash table is placed in the new entry of the root ancestor hash table.

42. The apparatus of claim 40, wherein an entry of the root ancestor hash table has a key matching the search string and wherein execution of the set of instructions further causes the processing system to:
place the marker identifying the selected hash table in the matching entry of the root ancestor hash table if a threshold number of markers will not be exceeded at the matching entry.

43. The apparatus of claim 42, wherein placement of the marker in the matching entry of the root ancestor hash table will exceed the threshold number of markers and wherein execution of the set of instructions further causes the processing system to:
access an existing marker in the matching entry of the root ancestor hash table; and
place the marker in a hash table identified by the existing marker, wherein the identified hash table is an ancestor to the selected hash table.

44. The apparatus of claim 43, wherein execution of the set of instructions further causes the processing system, when placing the marker in the hash table identified by the existing marker, to:
create a search string based upon the rule and a bit mask of the hash table identified by the existing marker; and
compare the search string with each of a number of entries of the hash table identified by the existing maker, wherein the marker is placed in one of the entries having a key matching the search string.

45. The apparatus of claim 42, wherein placement of the marker in the matching entry of the root ancestor hash table will exceed the threshold number of markers and wherein execution of the set of instructions further causes the processing system to:
override the threshold number of markers; and
place the marker identifying the selected hash table in the matching entry of the root ancestor hash table.

46. The apparatus of claim 42, wherein the threshold number of markers is one.

47. The apparatus of claim 36, wherein the bit mask of the selected hash table and the bit mask of the rule each comprise a tuple of dimension X.

48. The apparatus of claim 47, wherein the dimension X comprises a number in a range of from 2 to 5.

49. An article of manufacture comprising:
a computer accessible medium providing content that, when accessed by a computer, causes the computer to:
select from a number of hash tables a hash table having a bit mask corresponding to a bit mask of a rule;
add an entry for the rule to the selected hash table; and
if the selected hash table has an ancestor hash table that is a root node, place a marker in the root ancestor hash table, the marker identifying the selected hash table, wherein the content, when accessed, further causes the computer to create a search string based upon the rule and a bit mask of the root ancestor hash table.

50. The article of manufacture of claim 49, wherein the added entry includes a key corresponding to the rule.

51. The article of manufacture of claim 50, wherein the content, when accessed, further causes the computer to place a rule identifier in the added entry, the rule identifier identifying the rule.

52. The article of manufacture of claim 51, wherein the content, when accessed, further causes the computer to place in the added entry a priority associated with the rule.

53. The article of manufacture of claim 49, wherein the content, when accessed, further causes the computer to compare the search string with each of a number of entries of the root ancestor hash table to determine whether one of the entries has a key matching the search string.

54. The article of manufacture of claim 53, wherein the content, when accessed, further causes the computer to:
if none of the entries of the root ancestor hash table has a key matching the search string,
add a new entry to the root ancestor hash table; and
place a key in the new entry, the key corresponding to the search string;
wherein the marker identifying the selected hash table is placed in the new entry of the root ancestor hash table.

55. The article of manufacture of claim 53, wherein an entry of the root ancestor hash table has a key matching the search string and wherein the content, when accessed, further causes the computer to:
place the marker identifying the selected hash table in the matching entry of the root ancestor hash table if a threshold number of markers will not be exceeded at the matching entry.

56. The article of manufacture of claim 55, wherein placement of the marker in the matching entry of the root ancestor hash table will exceed the threshold number of markers and wherein the content, when accessed, further causes the computer to:
access an existing marker in the matching entry of the root ancestor hash table; and
place the marker in a hash table identified by the existing marker, wherein the identified hash table is an ancestor to the selected hash table.

57. The article of manufacture of claim 56, wherein the content, when accessed, further causes the computer, when placing the marker in the hash table identified by the existing marker, to:
create a search string based upon the rule and a bit mask of the hash table identified by the existing marker; and
compare the search string with each of a number of entries of the hash table identified by the existing maker, wherein the marker is placed in one of the entries having a key matching the search string.

58. The article of manufacture of claim 55, wherein placement of the, marker in the matching entry of the root ancestor hash table will exceed the threshold number of markers and wherein the content, when accessed, further causes the computer to:
override the threshold number of markers; and
place the marker identifying the selected hash table in the matching entry of the root ancestor hash table.

59. The article of manufacture of claim 55, wherein the threshold number of markers is one.

60. The article of manufacture of claim 49, wherein the bit mask of the selected hash table and the bit mask of the rule each comprise a tuple of dimension X.

61. The article of manufacture of claim 60, wherein the dimension X comprises a number in a range of from 2 to 5.

* * * * *

UNITED STATES PATENT AND TRADEMARK OFFICE
CERTIFICATE OF CORRECTION

PATENT NO. : 7,394,809 B2 Page 1 of 1
APPLICATION NO. : 10/404202
DATED : July 1, 2008
INVENTOR(S) : Kumar et al.

It is certified that error appears in the above-identified patent and that said Letters Patent is hereby corrected as shown below:

On Sheet 8 of 20, in FIG. 7C (Reference Numeral 702b), line 1, delete "255.128 * *" and insert -- 255.128.*.* --, therefor.

On Sheet 9 of 20, in FIG. 8 (Reference Numeral 802b), line 1, delete "128.128 * *" and insert -- 128.128.*.* --, therefor.

On Sheet 11 of 20, in FIG. 10A (Reference Numeral 1000a), line 1, delete "255.* * *" and insert -- 255.*.*.* --, therefor.

On Sheet 11 of 20, in FIG. 10A (Reference Numeral 1000b), line 1, delete "255.255.* *" and insert -- 255.255.*.* --, therefor.

On Sheet 12 of 20, in FIG. 10B (Reference Numeral 1000g), line 1, delete "128.128.* *" and insert -- 128.128.*.* --, therefor.

In column 23, line 42, in Claim 31, delete "maker," and insert -- marker, --, therefor.

In column 24, line 4, in Claim 36, delete "farther" and insert -- further --, therefor.

In column 24, line 57, in Claim 44, delete "maker," and insert -- marker, --, therefor.

In column 26, line 26, in Claim 57, delete "maker," and insert -- marker, --, therefor.

Signed and Sealed this

Third Day of February, 2009

JOHN DOLL
*Acting Director of the United States Patent and Trademark Office*